US011941936B2

(12) United States Patent
Enomoto

(10) Patent No.: US 11,941,936 B2
(45) Date of Patent: Mar. 26, 2024

(54) APPARATUS FOR DISCRIMINATION AND CONVEYANCE OF COINS

(71) Applicant: ASAHI SEIKO CO., LTD., Tokyo (JP)

(72) Inventor: Minoru Enomoto, Saitama (JP)

(73) Assignee: ASAHI SEIKO CO., LTD., Tokyo (JP)

( * ) Notice: Subject to any disclaimer, the term of this patent is extended or adjusted under 35 U.S.C. 154(b) by 178 days.

(21) Appl. No.: 16/807,498

(22) Filed: Mar. 3, 2020

(65) Prior Publication Data

US 2020/0286320 A1 Sep. 10, 2020

(30) Foreign Application Priority Data

Mar. 4, 2019 (JP) ................................. 2019-038996

(51) Int. Cl.
*G07D 3/14* (2006.01)
*G07D 3/12* (2006.01)
*G07D 5/02* (2006.01)

(52) U.S. Cl.
CPC ............... *G07D 3/14* (2013.01); *G07D 3/128* (2013.01); *G07D 5/02* (2013.01); *G07D 2205/00* (2013.01)

(58) Field of Classification Search
CPC ............ G07D 3/14; G07D 3/128; G07D 5/02; G07D 2205/00; G07D 9/008; G07D 3/125
See application file for complete search history.

(56) References Cited

U.S. PATENT DOCUMENTS

2003/0148728 A1* 8/2003 Abe ......................... G07D 1/00 453/52
2003/0201146 A1* 10/2003 Abe ......................... G07D 1/02 194/302

(Continued)

FOREIGN PATENT DOCUMENTS

JP 57-123574 8/1982
JP 60-144891 A 7/1985

(Continued)

OTHER PUBLICATIONS

Japan Office Action issued in Japanese Patent Application No. 2019-038996, dated Jul. 7, 2021 and partial English language translation thereof.

(Continued)

*Primary Examiner* — Jeffrey A Shapiro
(74) *Attorney, Agent, or Firm* — GREENBLUM & BERNSTEIN, P.L.C.

(57) ABSTRACT

An apparatus for discrimination and conveyance of coins achieves downsizing of this apparatus itself with a simple and low-cost structure compared with conventional ones. The apparatus includes a coin separation unit, a coin discrimination unit, and a coin conveyance and distribution unit. Coins separated in the coin separation unit are moved in a first direction through a first delivering region and delivered to the coin discrimination unit. The coins whose denomination and authenticity are discriminated in the coin discrimination unit are moved in a second direction approximately perpendicular to the first direction in a plan view through a second delivering region and delivered to the coin conveyance and distribution unit. In the second delivering region, a conveying direction of the coins is changed from the first direction to the second direction. The coins are distributed while being conveyed in the second direction in the coin conveyance and distribution unit.

10 Claims, 32 Drawing Sheets

(56) References Cited

U.S. PATENT DOCUMENTS

| | | | | |
|---|---|---|---|---|
| 2007/0087675 A1* | 4/2007 | Umeda | G07D 9/00 | 453/3 |
| 2007/0207717 A1* | 9/2007 | Enomoto | G07D 1/00 | 453/49 |
| 2009/0029638 A1* | 1/2009 | Enomoto | G07D 9/008 | 453/57 |
| 2009/0215371 A1* | 8/2009 | Girrbach | G07D 3/06 | 453/3 |
| 2009/0227193 A1* | 9/2009 | Tanaka | G07D 3/14 | 453/3 |
| 2010/0062700 A1* | 3/2010 | Nakazumi | G07D 3/14 | 453/19 |
| 2012/0122385 A1* | 5/2012 | Watson | G07D 3/14 | 453/18 |
| 2014/0194045 A1* | 7/2014 | Fischer | G07D 1/00 | 453/3 |
| 2015/0206368 A1* | 7/2015 | Fischer | G07D 9/00 | 453/3 |
| 2016/0086413 A1* | 3/2016 | Blythin | G07D 9/008 | 453/18 |
| 2016/0171809 A1* | 6/2016 | Ohtomo | G07D 5/02 | 194/317 |
| 2018/0342124 A1* | 11/2018 | Takeuchi | G07D 3/02 | |
| 2019/0333306 A1* | 10/2019 | Matsumoto | G07D 11/14 | |

FOREIGN PATENT DOCUMENTS

| | | |
|---|---|---|
| JP | 2007-114978 | 5/2007 |
| JP | 4997374 B2 | 8/2012 |
| JP | 2014-134972 | 7/2014 |
| JP | 5760233 B2 | 8/2015 |
| JP | 6074640 B2 | 2/2017 |
| WO | 99/48058 A1 | 9/1999 |

OTHER PUBLICATIONS

Extended European Search Report issued in European Patent Application No. 20160678, dated Aug. 3, 2020.

* cited by examiner

APPARATUS FOR DISCRIMINATION AND CONVEYANCE OF COINS

BACKGROUND OF THE INVENTION

1. Field of the Invention

The present invention relates to an apparatus for discrimination and conveyance of coins and more particularly, to an apparatus for automatically conducting separation and discrimination of coins which are stored in a storing unit and subsequent conveyance and distribution of the coins thus separated and discriminated.

In this specification, the term “coin” has a wide meaning that includes not only coins as currency but also coin equivalents such as tokens and medals other than coins as currency, in which the shape of a “coin” is not limited to a circular one and may be a polygonal or any other one.

2. Description of the Related Art

Conventionally, apparatuses for automatically conducting separation and discrimination of coins and subsequent conveyance and distribution of the coins thus separated and discriminated, which is typically used for a coin depositing/dispensing apparatus, have been known. For example, Japanese Examined Patent Publication No. 5760233 issued on Jun. 19, 2015 discloses a coin depositing/dispensing apparatus which comprises a coin separation unit using a rotary disk (a rotary plate), a denomination discrimination unit using a rotary wiper (a rotor), and a coin conveyance and distribution unit using an endless belt and a guide rail. The coin separation unit, the denomination discrimination unit, and the conveyance and distribution unit are aligned in such a way that coins to be processed are conveyed along an approximately straight line in a horizontal plane when seeing macroscopically.

Japanese Examined Patent Publication No. 4997374 issued on May 25, 2012 discloses a coin depositing/dispensing apparatus which has an approximately the same structure as that disclosed by Publication No. 5760233.

Japanese Examined Patent Publication No. 6074640 issued on Jan. 20, 2017 discloses a coin sorting apparatus using image discrimination which has a rotary wiper for denomination discrimination and a chute mounted below the rotary wiper. The denomination of coins is discriminated using the rotary wiper and the coins thus discriminated are sorted according to their denominations and thereafter, the coins are guided by the chute to coin storing containers which are provided for the respective denominations.

With the conventional apparatuses for discrimination and conveyance of coins, such as the coin depositing/dispensing apparatus disclosed in Publication Nos. 5760233 and No. 4997374 described above, the coin separation and discrimination section contains the coin separation unit that separates coins which are stored in a container, and the denomination discrimination unit that discriminates the denomination of the coins thus separated and therefore, the whole length of this separation and discrimination section is likely to be long. For this reason, there arises a problem that the size of a coin depositing/dispensing apparatus increases inevitably if the said coin separation and discrimination section is combined with the coin conveyance and distribution unit that distributes the denomination-discriminated coins into the coin storing containers which are provided for the respective denominations while conveying the said coins, thereby constituting the coin depositing/dispensing apparatus. If the coin separation and discrimination section and/or the coin conveyance and distribution unit can be downsized, the apparatus for discrimination and conveyance of coins (and therefore, the coin depositing/dispensing apparatus) can be downsized. However, it is not necessarily easy to downsize them. Accordingly, it is very effective if the coin depositing/dispensing apparatus can be downsized in a different manner from the method of downsizing the coin separation and discrimination section and/or the coin conveyance and distribution unit itself/themselves.

With the aforementioned structure disclosed in Publication No. 6074640, the rotary wiper and the chute mounted below the same are used to largely change the conveying direction of coins to be processed and therefore, from the aforementioned point of view, there is a possibility that the coin depositing/dispensing apparatus may be downsized as desired by using any structure which is the same as or similar to that disclosed in Publication No. 6074640. However, desired downsizing cannot be achieved by simply using such the manner as described above.

SUMMARY OF THE INVENTION

The present invention was created while taking the aforementioned circumstances into consideration.

Accordingly, an object of the present invention is to provide an apparatus for discrimination and conveyance of coins that makes it possible to achieve downsizing of this apparatus itself with a simple and low-cost structure compared with the aforementioned conventional apparatuses of this type.

Another object of the present invention is to provide an apparatus for discrimination and conveyance of coins that makes it possible to achieve downsizing of this apparatus itself compared with the aforementioned conventional apparatuses of this type without changing the fundamental or basic structure of the coin discrimination unit.

The above objects together with others not specifically mentioned here will become clear to those skilled in the art from the following description.

An apparatus for discrimination and conveyance of coins according to the present invention comprises:

a coin separation unit that is configured to separate coins which are stored in a coin storing unit from each other, thereby sending the separated coins in a predetermined attitude;

a coin discrimination unit, mounted on a supporting member which comprises an opening, that is configured to discriminate a denomination of coins which are sent from the coin separation unit, thereby sending the discriminated coins; and a coin conveyance and distribution unit that is configured to distribute coins which are subjected to denomination discrimination in the coin discrimination unit according to respective denominations while conveying the coins.

wherein coins separated in the coin separation unit are moved in a first direction in a plan view through a first delivering region and delivered to the coin discrimination unit; wherein the first delivering region is formed at a connecting part of the coin separation unit to the coin discrimination unit;

coins whose denomination is discriminated in the coin discrimination unit are moved in a second direction which is approximately perpendicular to the first direction in a plan view through a second delivering region and delivered to the coin conveyance and distribution unit; wherein the second delivering region is formed at a connecting part of the coin discrimination unit and the coin conveyance and distribution unit;

a moving direction of coins is changed from the first direction to the second direction through the opening in the second delivering region; and coins are subjected to distribution while being conveyed in the second direction in the coin conveyance and distribution unit.

With the apparatus for discrimination and conveyance of coins according to the present invention, as explained above, coins which are separated from each other by the coin separation unit are moved along the first direction in a plan view through the first delivering region to be delivered to the coin discrimination unit and then, the denomination of the coins are discriminated by the coin discrimination unit. Thereafter, the coins thus discriminated are moved along the second direction which is approximately perpendicular to the first direction in a plan view to be delivered to the coin conveyance and distribution unit. In the coin separation unit, a plate-shaped rotating member such as a rotary disk is usually used and therefore, when seeing in a plan view, the ratio (Ls/Ds) of the length Ls of the coin separation unit in the first direction with respect to the depth Ds of the same in the second direction is considerably large in value while taking the fact that a driving mechanism for the rotating member is disposed adjacent to the rotating member on its back side into consideration. This is because the length Ls of the coin separation unit in the first direction is considerably larger than the depth Ds of the coin separation unit in the second direction.

Moreover, in the coin discrimination unit, a plate-shaped rotating member such as a rotary wiper is usually used and therefore, when seeing in a plan view, the ratio (Ld/Dd) of the length Ld of the coin discrimination unit in the first direction with respect to the depth Dd of the same in the second direction is considerably large in value while taking the fact that a driving mechanism for the rotating member is disposed adjacent to the said rotating member on its back side, similar to the coin separation unit. This is because the length Ld of the coin discrimination unit in the first direction is considerably larger in value than the depth Dd of the coin separation unit in the second direction.

For this reason, regarding the combination of the coin separation unit and the coin discrimination unit (i.e., the coin separation and discrimination unit) which is formed by aligning the coin separation unit and the coin discrimination unit in the first direction to be adjacent to each other, the ratio (Lsd/Dsd) of the length Lsd of this combination in the first direction with respect to the depth Dsd of the same in the second direction is larger in value than each of the ratios (Ls/Ds) and (Ld/Dd). This means that the coin separation and discrimination unit as the combination has a feature that the length Lsd is relatively large and the depth Dsd is relatively small and that the ratio (Lsd/Dsd) of the length Lsd with respect to the depth Dsd is very large, in other words, the coin separation and discrimination unit has an elongated shape which is elongated in the first direction.

On the other hand, in the coin conveyance and distribution unit, since a plurality of coin ejection devices are arranged along a straight line, the length Lcd varies in accordance with the total number of the denominations to be processed. However, generally speaking, the coin conveyance and distribution unit has a feature that the length Lcd is relatively large and the depth Dcd is relatively small and that the ratio (Lcd/Dcd) of the length Lcd with respect to the depth Dcd is very large, in other words, the coin conveyance and distribution unit has an elongated shape which is elongated along the straight line.

Accordingly, when constituting the apparatus for discrimination and conveyance of coins by combining the aforementioned combination (i.e., the coin separation unit and the discrimination unit which are aligned along a straight line) with the coin conveyance and distribution unit, it is preferred that the aforementioned combination and the coin conveyance and distribution unit are disposed so as to be perpendicular to each other in a plan view to reduce the size of the apparatus. For example, it is preferred that the aforementioned combination is disposed in the first direction and the coin conveyance and distribution unit (or the coin conveyance path) is disposed in the second direction in a plan view. This layout may be termed the "L-shaped layout". This is because the length of apparatus using the L-shaped layout in the second direction is considerably smaller than that of the conventional linear layout where both of the aforementioned combination (i.e., the coin separation and discrimination unit) and the coin conveyance and distribution unit are disposed in the second direction. This is reflection of the aforementioned feature that the coin separation and discrimination unit (i.e., the combination of the coin separation unit and the coin discrimination unit) has an elongated shape extended in the first direction and the feature that the coin conveyance and distribution unit has an elongated shape extended in the second direction.

As a result, the apparatus for discrimination and conveyance of coins according to the present invention can be downsized compared with the aforementioned conventional apparatus of this type.

Moreover, since the need for realizing the aforementioned L-shaped layout is to change the moving direction of coins which are moved in the aforementioned combination (i.e., the coin separation and discrimination unit) to the second direction from the first direction and vice versa by way of the second delivering region formed at the connecting part of the coin discrimination unit and the coin conveyance and distribution unit, the aforementioned downsizing can be realized with a simple and low-cost structure.

Furthermore, to realize the aforementioned downsizing, it is sufficient to provide the second delivering region at the connecting part of the coin discrimination unit and the coin conveyance and distribution unit and therefore, it is unnecessary to change the fundamental or basic structure of the coin discrimination unit. Accordingly, downsizing of the said apparatus itself can be achieved compared with the aforementioned conventional apparatuses of this type without changing the fundamental or basic structure of the coin discrimination unit.

In a preferred embodiment of the apparatus according to the present invention, the coin discrimination unit conducts its discrimination operation for coins which are delivered from the coin separation unit by way of the first delivering region using a plate-shaped rotating member (e.g., a rotary wiper) which is rotationally driven on the supporting member.

In another preferred embodiment of the apparatus according to the present invention, the coin discrimination unit conducts its discrimination operation for coins which are delivered from the coin separation unit by way of the first delivering region using a plate-shaped rotating member (e.g., a rotary wiper) which is rotationally driven on the supporting member and a guide wall which is formed on the supporting member; and the guide wall conducts its guiding operation (i) when coins are delivered from the coin separation unit to the coin discrimination unit by way of the first delivering region, (ii) when coins which are delivered to the coin discrimination unit are moved in the coin discrimination unit, and (iii) when coins which are moved in the coin discrimination unit are delivered to the coin conveyance and distribution unit by way of the second delivering region.

In still another preferred embodiment of the apparatus according to the present invention, the coin discrimination unit comprises a plate-shaped rotary member (e.g., a rotary wiper) which is rotationally driven on the supporting member inclined with respect to a horizontal plane, and discrimination sensors fixed on the supporting member in a discrimination region that is overlapped with the rotary member; and discrimination of coins which are delivered from the coin separation unit to the coin discrimination unit by way of the first delivering region is performed using the discrimination sensors when the coins pass through the discrimination region in response to rotation of the rotary member.

In a further preferred embodiment of the apparatus according to the present invention, the coin separation unit conducts its separation operation for coins which are stored in the coin storing unit from each other using a plate-shaped rotary member (e.g., a rotary disk) which is rotationally driven on the supporting member.

In a further preferred embodiment of the apparatus according to the present invention, the coin separation unit is mounted on the supporting member along with the coin discrimination unit; and the first delivering region is formed on the supporting member.

In a further preferred embodiment of the apparatus according to the present invention, there are provided with a direction changing member that is formed to change a moving direction of coins which are delivered from the coin discrimination unit through the opening; and a coin conveyance path, formed in the coin conveyance and distribution unit, that is configured to allow the delivered coins from the coin discrimination unit through the opening to move for distribution;

wherein the direction changing member is disposed near an entrance of the coin conveyance path;

the direction changing member is configured in such a way that the delivered coins from the coin discrimination unit through the opening are contacted with the direction changing member, thereby adjusting the moving direction of the delivered coins from the coin discrimination unit to the entrance of the coin conveyance path.

In a further preferred embodiment of the apparatus according to the present invention, the direction changing member and the coin conveyance and distribution unit are placed on a back side of the supporting member; and the delivered coins from the coin discrimination unit through the opening are contacted with the direction changing member and entered the entrance of the coin conveyance path on the back side of the supporting member using natural falling of the coins due to gravity.

In a further preferred embodiment of the apparatus according to the present invention, the coin conveyance path is formed using a guide rail and an inclined surface;

the guide rail forms a bottom of the coin conveyance path;

the inclined surface forms one sidewall of the coin conveyance path; and coins are conveyed on the coin conveyance path in an obliquely standing state while a periphery and one side of each coin are respectively supported by the guide rail and the inclined surface.

In a further preferred embodiment of the apparatus according to the present invention, an endless belt to which pins are fixed at intervals is extended along the coin conveyance path; and each coin is engaged with any one of the pins and conveyed on the coin conveyance path according to traveling of the belt.

In a further preferred embodiment of the apparatus according to the present invention, the belt is travelled by a common driving force in synchronization with an operation motion of the coin separation unit and an operation of the coin discrimination unit.

BRIEF DESCRIPTION OF THE DRAWINGS

In order that the present invention may be readily carried into effect, it will now be described in detail with reference to the accompanying drawings.

FIG. 14O is an explanatory view showing the coin feeding operation of the coin separation and discrimination unit of the apparatus for discrimination and conveyance of coins of FIG. 1, in which the head and the substrate box are detached, which is subsequent to FIG. 14N.

DETAILED DESCRIPTION OF THE INVENTION

Figure 1:
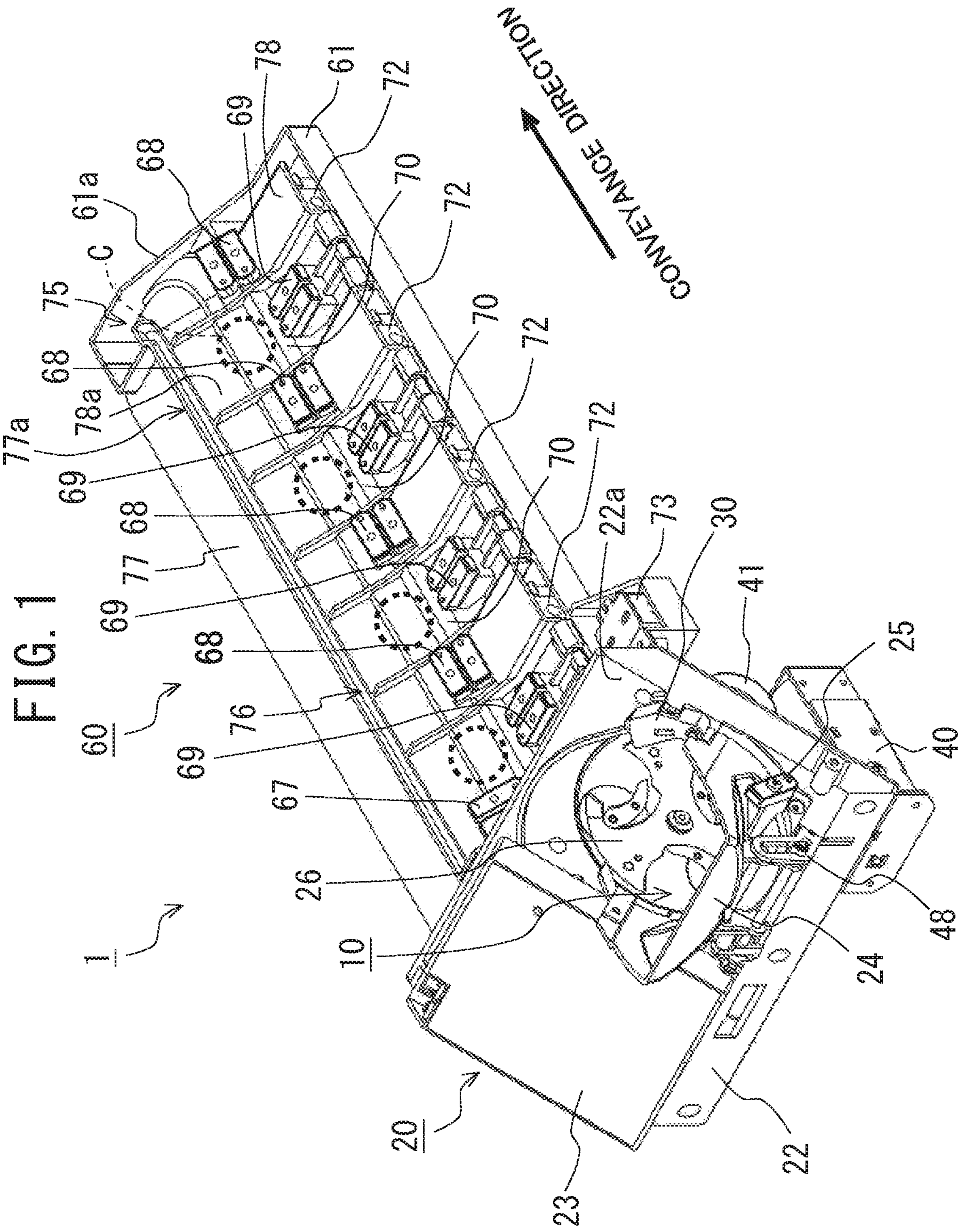
FIG. 1 is a perspective view showing the overall structure of an apparatus for discrimination and conveyance of coins according to an embodiment of the present invention, which is seen obliquely downward from the upper left front.
Figure 2:
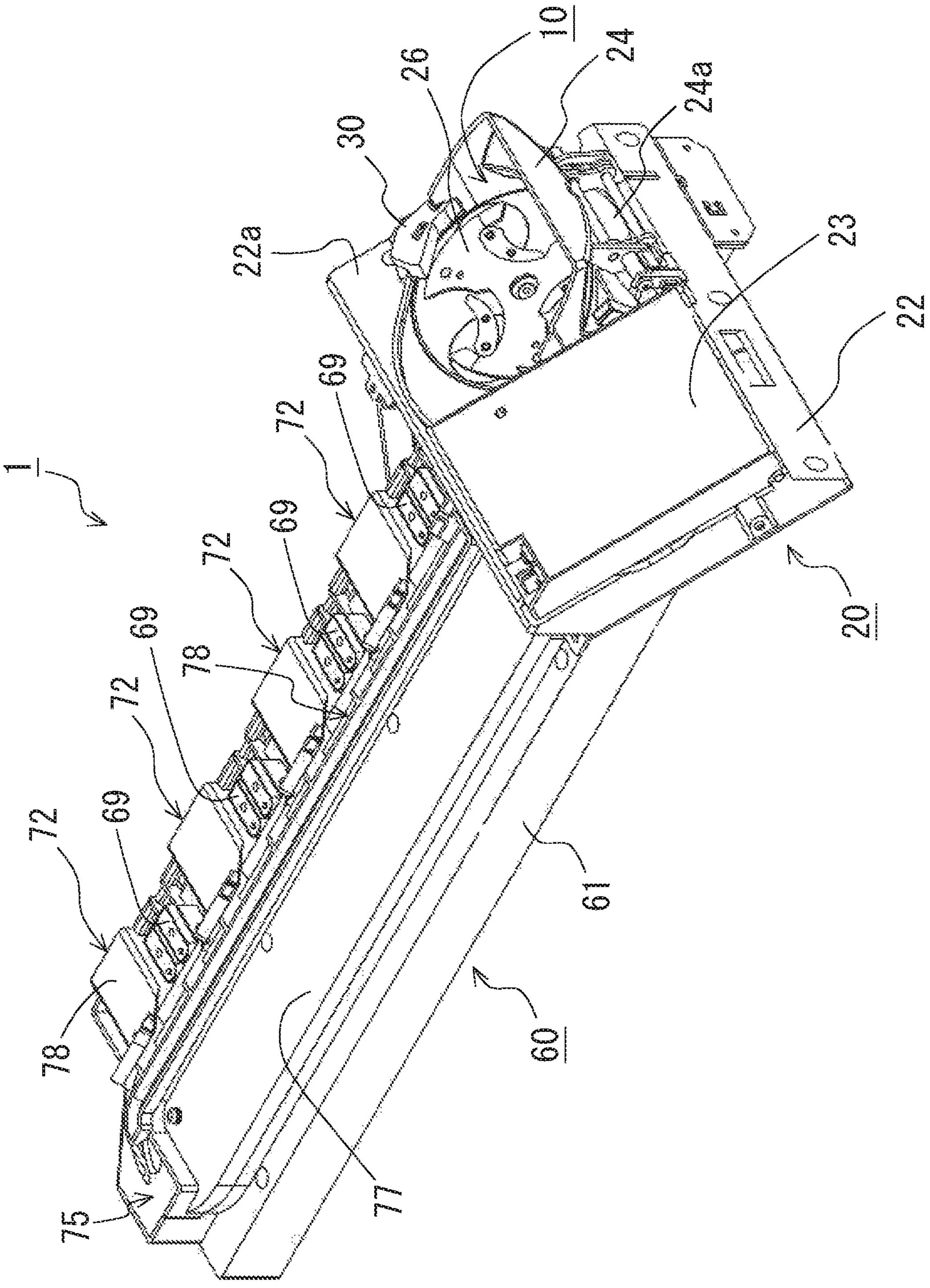
FIG. 2 is a perspective view showing the overall structure of the apparatus for discrimination and conveyance of coins of FIG. 1, which is seen obliquely downward from the upper left rear.
Figure 3:
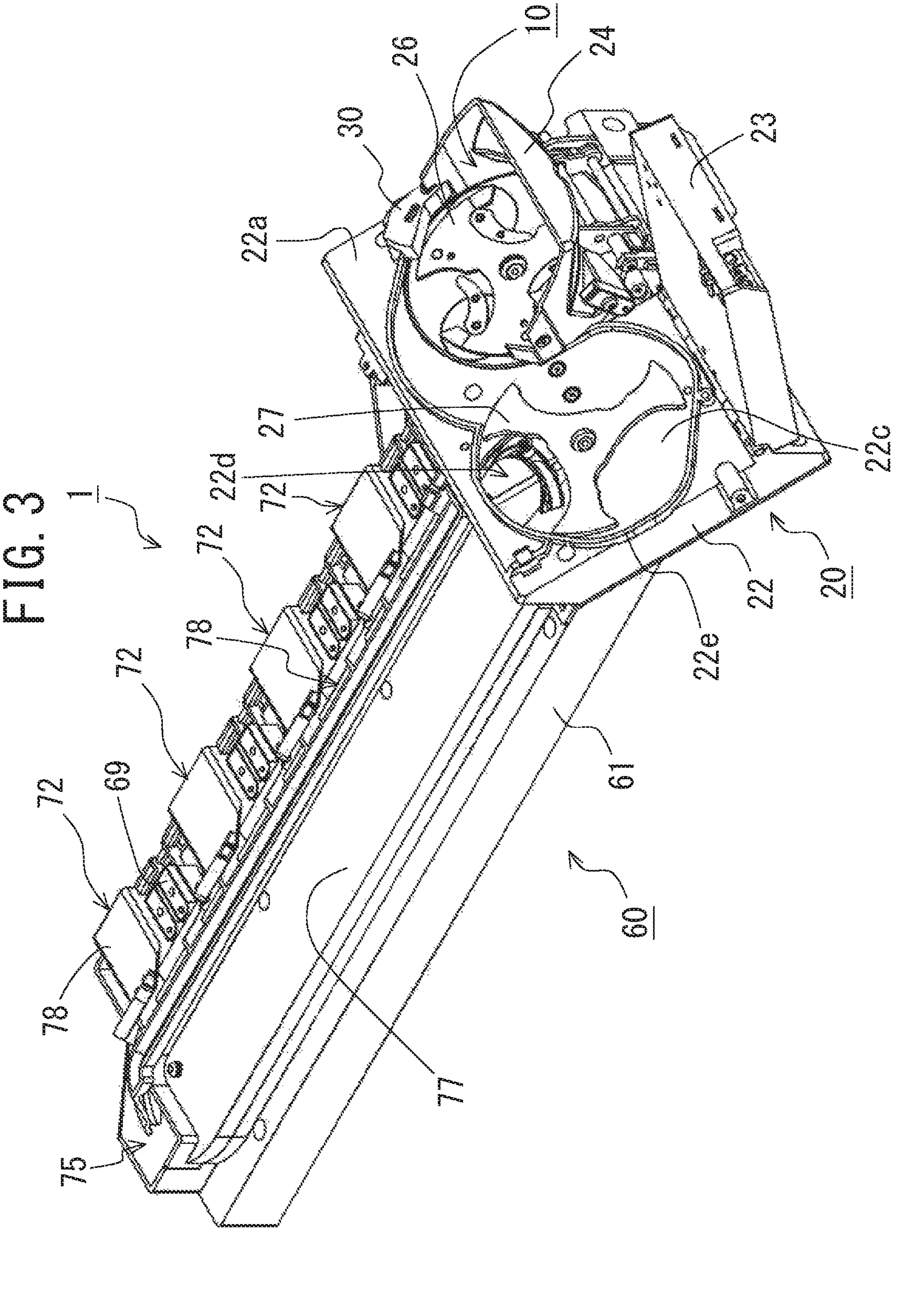
FIG. 3 is a perspective view showing the overall structure of the apparatus for discrimination and conveyance of coins of FIG. 1, in which a substrate box is open and which is seen obliquely downward from the upper left rear.

Preferred embodiments of the present invention will be described in detail below while referring to the drawings attached.

Structure of Apparatus for Discrimination and Conveyance of Coins

The schematic overall structure of an apparatus 1 for discrimination and conveyance of coins according to an embodiment of the present invention is shown in FIGS. 1 to 8. Since this apparatus 1 is configured to conduct discrimination and conveyance operations for coins C of eight denominations, coins C that are distributed according to the eight denominations while being conveyed are sent to eight coin ejection devices (not shown) which are prepared to the respective denominations and stored therein.

The apparatus 1 for discrimination and conveyance of coins according to the embodiment of the present invention comprises mainly a coin storing unit 10, a coin separation and discrimination unit 20, and a coin conveyance and distribution unit 60. As dearly shown in FIGS. 11 to 13, a second delivering region P2 is formed at the connecting part of the coin separation and discrimination unit 20 and the coin conveyance and distribution unit 60. Coins C which are subjected to a coin separation operation and a denomination discrimination operation by the coin separation and discrimination unit 20 are then delivered to the coin conveyance and distribution unit 60 by way of the second delivering region P2. Moreover, the coin separation and discrimination unit 20 is divided into a coin separation section which uses a rotary disk 26 and a coin discrimination section which uses a rotary wiper 27. The details of the disk 26 and the wiper 27 will be explained later. A first delivering region P1 is formed at the connecting part of the coin separation section and the coin discrimination section. Coins C which are subjected to the coin separation operation by the coin separation section are then delivered to the coin discrimination section by way of the first delivering region P1.

In addition, a coin discrimination region P3 for discriminating the denomination and authenticity of coins C is formed in the coin discrimination section. When coins C which are rotated with the rotation of the rotary wiper 27 pass through the coin discrimination region P3, they are subjected to the denomination discrimination and the authenticity discrimination using discrimination sensors 46 provided in or near the coin discrimination region P3.

The coin storing unit 10 comprises a head 24 attached to the surface of an upper wall 22*a* (see FIG. 9) of a casing 22 of the coin separation and discrimination unit 20. The head 24 is a curved plate-like member, here. A hollow space, to which the rotary disk 26 is exposed, is formed on the depressed inner surface of the head 24 and the surface of the upper wall 22*a*. This space serves as a coin storing space of the coin storing unit 10.

The coin separation and discrimination unit 20 comprises the coin separation section that is configured to separate coins C stored in the coin storing unit 10 from each other and to sends the coins C thus separated in a predetermined inclined attitude, and the coin discrimination section that is configured to discriminate the denomination and authenticity of the coins C which are sent from the coin separation section and to sends the coins C thus discriminated to the coin conveyance and distribution unit 60. As seen from FIGS. 9 and 10, the coin separation section and the coin discrimination section are arranged to be adjacent to each other on the upper wall 22*a* of the casing 22 which has a shape like a rectangular parallelepiped. The upper wall 22*a* is placed to be inclined at 45° with respect to a horizontal plane. The bottom of the casing 22 is opened and the inside of the casing 22 is hollow. An approximately rectangular base plate 21 is attached to the opened bottom of the casing 20.

A first depressed part 22*b*, a second depressed part 22*c*, a through hole 22*d*, and a guide wall 22*e* are formed on the upper wall 22*a* of the casing 22. Since the first depressed part 22*b* is formed to receive the rotary disk 26 for coin separation, this part 22*b* has a circular shape whose diameter is slightly larger than the disk 26 and whose depth is enough for receiving the entirety of the disk 26. Since the second depressed part 22*d* is formed to receive the rotary wiper 27 for denomination discrimination and authentication discrimination of coins C, this part 22*c* has an approximately circular shape whose diameter is slightly larger than the wiper 27 and whose depth is enough for receiving the entirety of the wiper 27, which is similar to the first depressed part 22*b*. However, the second depressed part 22*c* is necessarily formed in such a way that coins C pass through the upper area of the discrimination sensors 46 for denomination discrimination and authentication discrimination while the coins C are being rotated by the rotary wiper 27 and therefore, the plan shape of this part 22*c* is slightly deformed from a perfect circle (see FIG. 9, for example). The discrimination sensors 46, which are fixed in the casing 22, are disposed in the coin discrimination region P3 of the second depressed part 22*c* (see FIGS. 11 to 13). The through hole 22*d* is formed to enable the coins C which have been subjected to denomination discrimination and authenticity discrimination on the upper wall 22*a* to arrive at the entrance of a coin conveyance path 76 which is disposed on the back side of the upper wall 22*a*. The through hole 22*d* is placed at the top of the second depressed part 22*c*, in other words, at the uppermost position to which the coins C can reach by the rotation of the wiper 27. Since the coins C of all the denominations to be processed (eight denominations here) need to pass through the upper wall 22*a*, the size of the through hole 22*d* is set in such a way as to be larger than the coins C having the largest diameter among all the denominations to be processed. The guide wall 22*e* is formed to define the second depressed part 22*c* and to guide the coins C which are rotated with the rotation of the wiper 27 for discriminating their denomination and authenticity.

Figure 9:
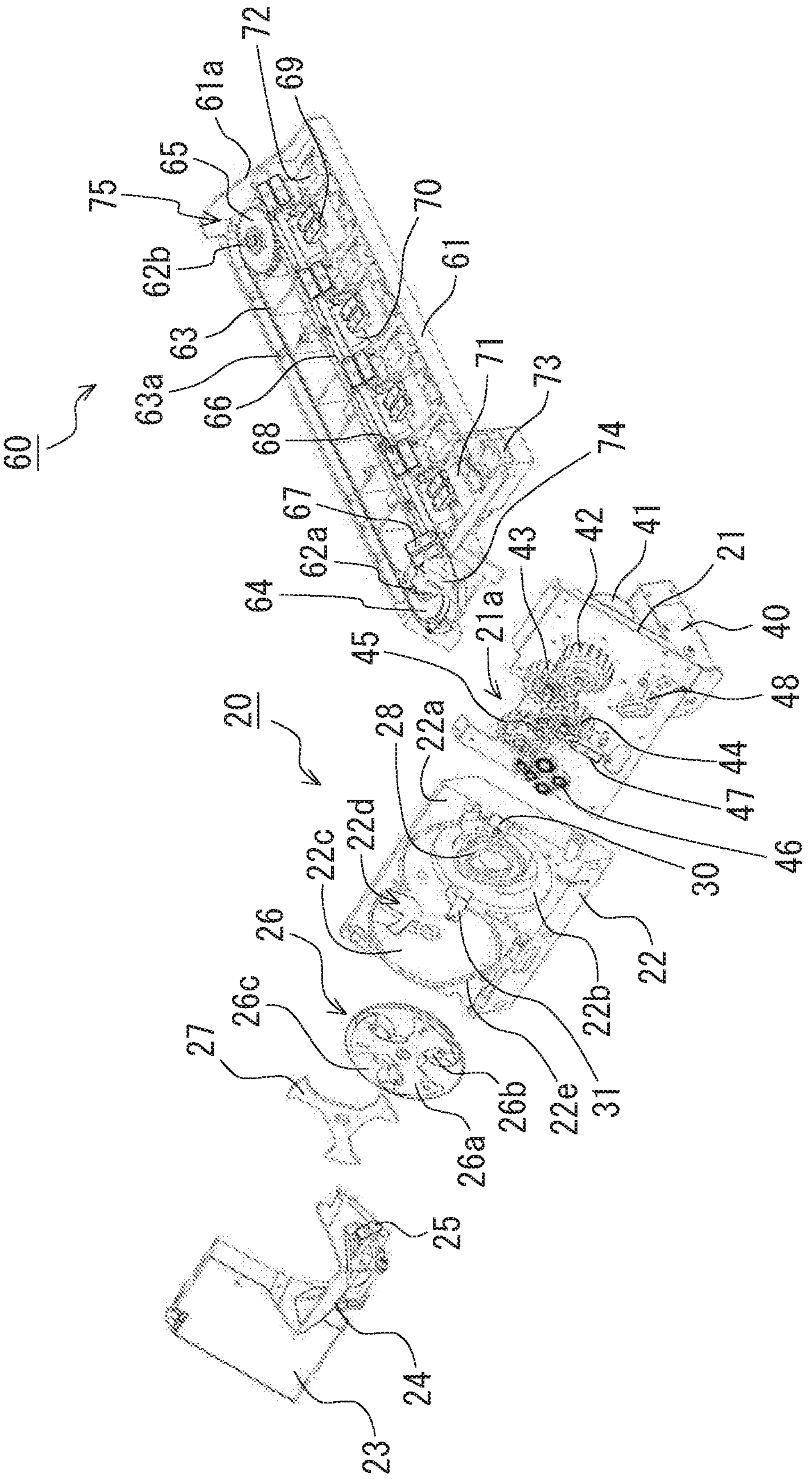
FIG. 9 is an exploded perspective view showing main constitutional elements of the apparatus for discrimination and conveyance of coins of FIG. 1, in which the rear and front covers are detached, which is seen obliquely downward from the upper left front.
Figure 10:
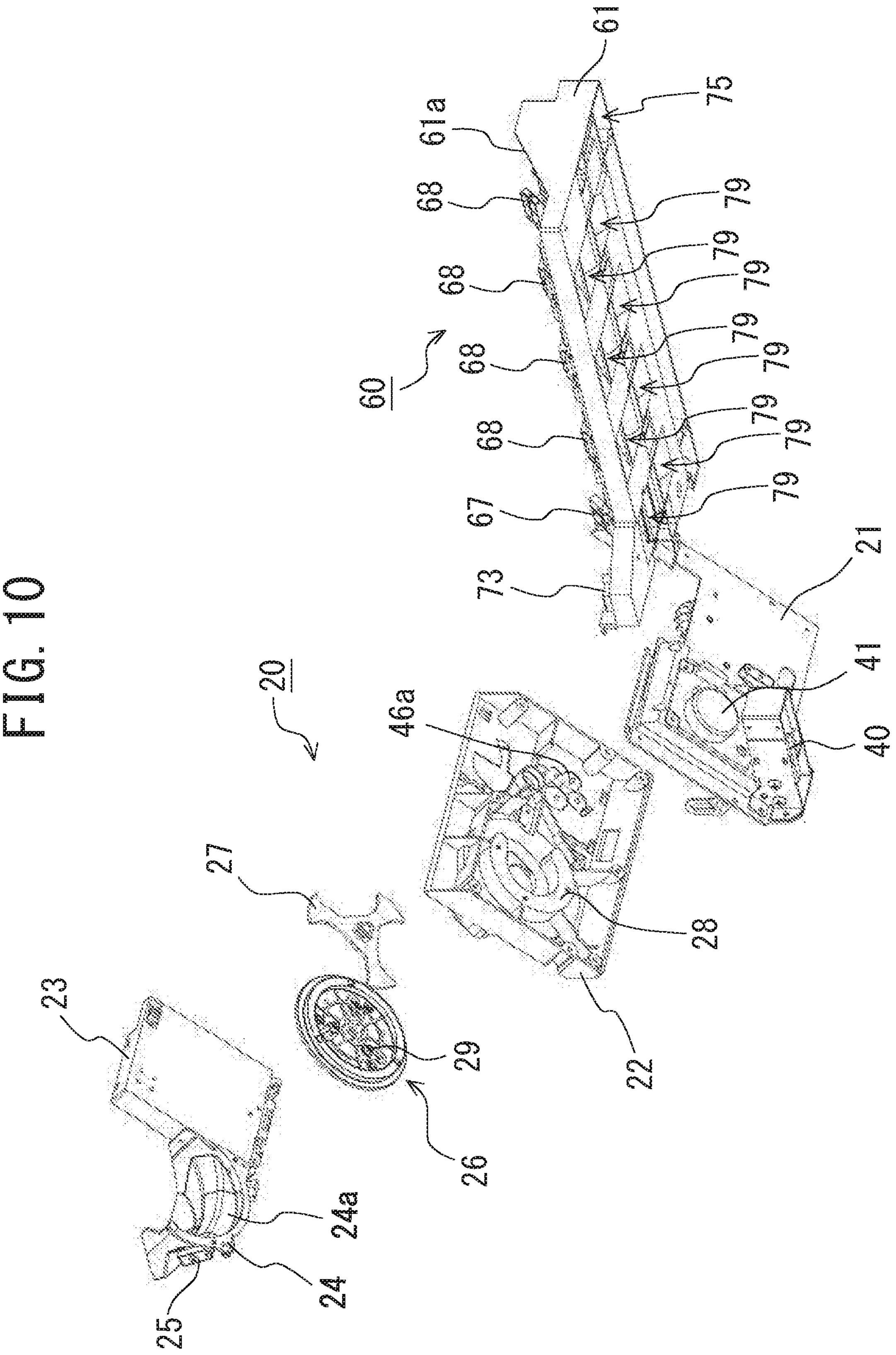
FIG. 10 is an exploded perspective view showing the main constitutional elements of the apparatus for discrimination and conveyance of coins of FIG. 1 in which the rear and front covers are detached, which is seen obliquely upward from the lower right rear.
Figure 11:
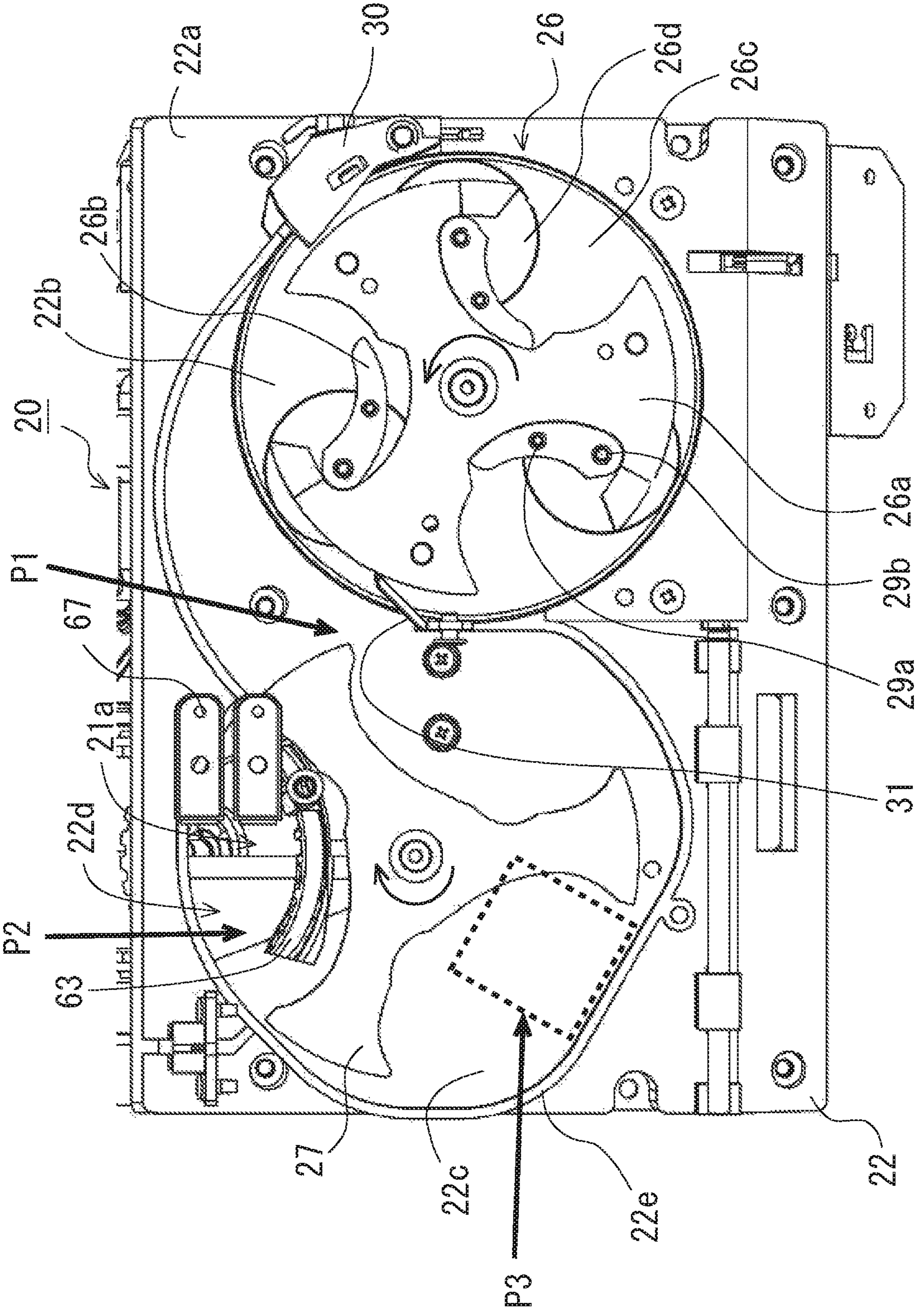
FIG. 11 is an enlarged explanatory view showing the structure of the coin separation and discrimination unit of the apparatus for discrimination and conveyance of coins of FIG. 1, in which the head and the substrate box are detached.
Figure 12:
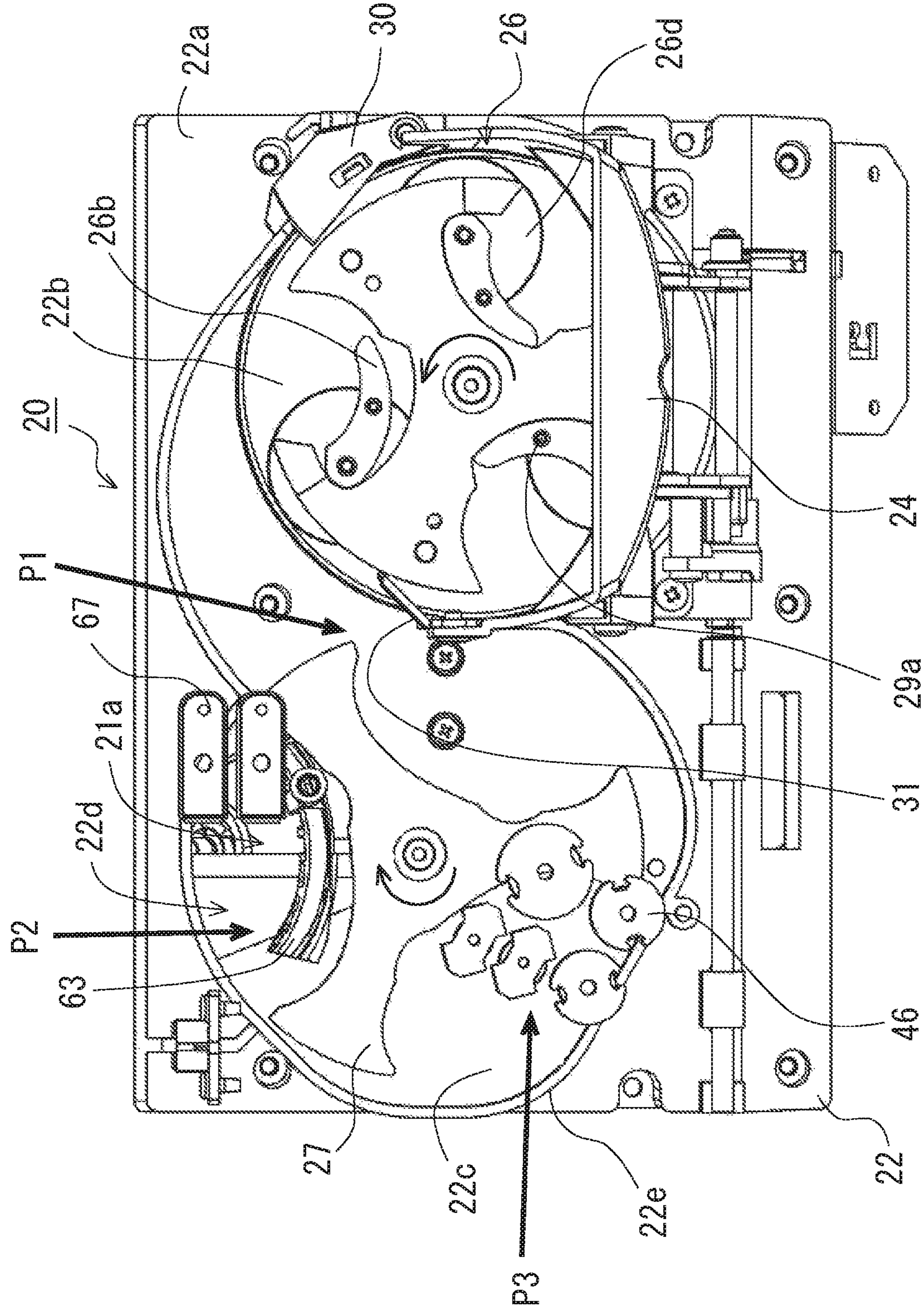
FIG. 12 is an enlarged explanatory view showing the structure of the coin separation and discrimination unit of the apparatus for discrimination and conveyance of coins of FIG. 1, in which the substrate box is detached so as to uncover underlying discrimination sensors.

As shown in FIGS. 9, 10, and 11, the rotary disk 26 for coin separation comprises a pushing part 26*a*, three pushing members 26*b*, and three dust drop prevention members 26*d*. The pushing part 26*a* has a shape which is formed by removing three portions from the surface layer of a circular plate to form three engaging recesses 26*c*, in which three coins C are respectively engaged with these engaging recesses 26*c*. The three pushing members 26*b* are respectively placed in the three engaging recesses 26*c* of the pushing part 26*a*. The three dust drop prevention members 26*c* are respectively placed right below the corresponding pushing members 26*b*. The pushing part 26*a* is formed to push coins C which are engaged with the engaging recesses 26*c* by the rotation of the rotary disk 26 in the first depressed part 22*b*. Each of the pushing members 26*b* is configured to be pivoted at the time immediately before a coin C which is being rotated by the rotation of the disk 26 passes through the first delivering region P1, thereby pushing the said coin C from the corresponding engaging recess 26*c* for smooth transition to the coin discrimination section. Each of the dust drop prevention member 26*d* is configured to prevent dust from falling to the position below the disk 26 to cause malfunctions. There is no restriction to the overall thickness of the disk 26; however, the thickness of the pushing part 26*a* is set so as not to be larger than the thickness of the thinnest coin C among all the denominations to be processed. This is because if the thickness of the pushing part 26*a* is set so as to be larger than the thickness of the thinnest coin C, there is a possibility that two or more of the coins C whose thicknesses are smaller than the thickness thus set are pushed simultaneously.

Coins C stored in the coin storing unit 10 tend to enter the three engaging recesses 26*c* of the rotary disk 26 at random to be moved according to the rotation of the disk 26. Since a coin dropping member 30 is fixed onto the upper wall 22*a* of the casing 22 in the vicinity of the first depressed part 22*b*, coins C which are raised wastefully by the rotation of the disk 26 are dropped and as a result, the coins C are entered the respective engaging recesses 26*c* one by one and rotated with the rotating disk 26 around the center of the disk 26. For this reason, the coins C stored in the storing unit 10 are separated from each other and entered the respective engaging recesses 26*c* one by one and thereafter, sent successively toward the rotary wiper 27. In this way, the coin separation operation for the coins C which are taken out of the storing unit 10 is carried out.

In the aforementioned coin separation process, each coin C which is entered and engaged with one of the three engaging recesses 26*c* is pushed by the pushing part 26*a*. Since of the relevant pushing member 26*b* is configured to push out the coin C from the corresponding engaging recess 26*c* immediately before the said coin pass through the first delivering region P1, the said coin C can be shifted smoothly to the coin discrimination section by way of the first delivering region P1. This pushing action of the relevant pushing member 26*b* is realized by a grooved cam 28 which is formed on the casing 22 at the position right below the disk 26 and three cam followers 29 which are fixed to the back surface of the disk 26. Specifically, as shown in FIGS. 9 and 10, the grooved cam 28 is formed on the upper wall 22*a* of the casing 22, and three cam follower pins 29*a* of the cam followers 29 are engaged with the groove of the cam 28. Since the cam follower pins 29*a* are moved along the groove of the cam 28 in accordance with the rotation of the disk 26, the pushing members 26*b* are pivoted outward or inward around their rocking shafts 29*b* which are provided for the respective pins 29*a*. As a result, each of the pushing members 26*b* can be pivoted to push out the coin C from the corresponding engaging recess 26*c* at the time immediately before the said coin C passes through the first delivering region P1 during its rotation, and can be kept close to the corresponding engaging recess 26*c* except for the time of conducting this pushing action.

Since a delivering direction regulation or control member 31 is fixed near the first delivering region P1, the coins C which pass through the first delivering region P1 are surely sent to the second depressed part 22*c* formed on the upper wall 22*a* of the casing 22. Here, the delivering direction regulation or control member 31 is fixed to the upper wall 22 at the position where the outer edge of the first depressed part 22*b* is next to the first delivering region P1.

As shown in FIGS. 9, 10, and 11, the rotary wiper 27 for denomination and authenticity discrimination has a simple shape which is formed by removing three portions from a circular plate to form three engaging holes for coins C. Thus, the wiper 27 has three radially extending arms which are arranged around the center of the wiper 27 at equal angular intervals. An engaging hole with which a coin C can be engaged is formed by the two adjoining arms of the wiper 27. The wiper 27 receives the coins C sent to the second depressed part 22*c* by way of the first delivering region P1 by using three arms, and discriminates the denomination and authenticity of the coins C thus received while rotating the coins C around the center of the wiper 27. Thereafter, the coins C thus discriminated are sent to the coin conveyance and distribution unit 60 by way of the second delivering region P2. The discrimination operation for the denomination and authenticity of the coins C is carried out in the discrimination region P3 formed in the second depressed part 22*c*. The through hole 22*d* is formed in the upper wall 22*a* of the casing 22 at the corresponding position to the second delivering region P2, and an opening 21*a* is formed on the top end of the base plate 21 which is placed on the back side of the casing 22. The opening 21*a* is disposed at the position overlapped with the through hole 22*d*. Therefore, the coins C whose denomination and authenticity have been discriminated can pass through the through hole 22*d* and the opening 21*a* which are disposed in the second delivering region P2 to the coin conveyance and distribution unit 60. This means that the said coins C can penetrate the casing 22 and the base plate 21 to reach the coin conveyance and distribution unit 60. The overall thickness of the rotary wiper 27 (which is approximately equal to the height of the guide wall 22*e*) is approximately the same as the thickness of the thickest coin C among all the denominations to be processed.

The coins C sent to the second depressed part 22*c* (i.e., the coin discrimination section) by the rotation of the rotary disk 26 are entered and engaged with the respective engaging holes of the wiper 27 while keeping their attitude (in which one side face of each coin C is supported by the inclined surface of the upper wall 22*a* of the casing 22) and then, moved in the second depressed part 22*c* along the guide wall 22*e* in accordance with the rotation of the rotary wiper 27. The moving path of the coins C in the coin discrimination section is extended to the second delivering region R2 from the first delivering region P1. However, the discrimination region P3 is formed between these two delivering regions P2 and P1 and therefore, discrimination of the denomination and authenticity of the coins C can be automatically carried out when the coins C pass through the discrimination region P3. The shape of the guide wall 22*e* (i.e., the shape of the moving path of the coins C) is determined in such a way that a desired denomination and authenticity discrimination operation of the coins C is automatically carried out in the discrimination region P3. For this reason, the denomination and authenticity discrimination operation of the coins C is conducted only by moving the coins C along the guide wall 22*e* in the second depressed part 22*c* using the rotary wiper 27.

The rotary disk 26 and the rotary wiper 27 that perform the above-described operations are rotationally driven using the driving force of a single electric motor 41 in the following way:

The electric motor 41 is fixed to the back surface of the base plate 21. The rotational shaft of this motor 41 is protruded from the surface of the base plate 21 through the same. A driving gear 42, which is connected to the rotational shaft of the motor 41, is exposed from the surface of the base plate 21. The rotation of the driving gear 42 is transmitted to driven gears 43, 44, and 45 which are rotatably supported on the surface of the base plate 21 in this order. Since the rotational shaft of the rotary disk 26 is connected to the driving gear 42, the rotary disk 26 is rotationally driven at the same rotational frequency as that of the driving gear 42. Since the rotational shaft of the rotary wiper 27 is connected to the driven gear 45, the wiper 27 is rotationally driven at the same rotational frequency as that of the driven gear 45. Since the count of the gear teeth of each of the driven gears 43, 44, and 45 is set in such a way that the rotational frequency per minute of the disk 26 is equal to that of the wiper 27, the disk 26 and the wiper 27 are rotated in the opposite directions at the same rotational speed. This means that the disk 26 is rotated in the counterclockwise direction and the wiper 27 is rotated in the clockwise direction, as shown in FIG. 11.

The discrimination sensors 46 are fixed to the surface of the base plate 12 in the discrimination region P3. As the discrimination sensors 46, any known sensor may be used and therefore, detailed explanation about the sensors 46 are omitted here. In addition, the reference numeral 46*a* shown in FIG. 10 denotes the part to which the discrimination sensors 46 are attached or mounted, which is termed a "discrimination sensor mounting part" here.

Figure 13:
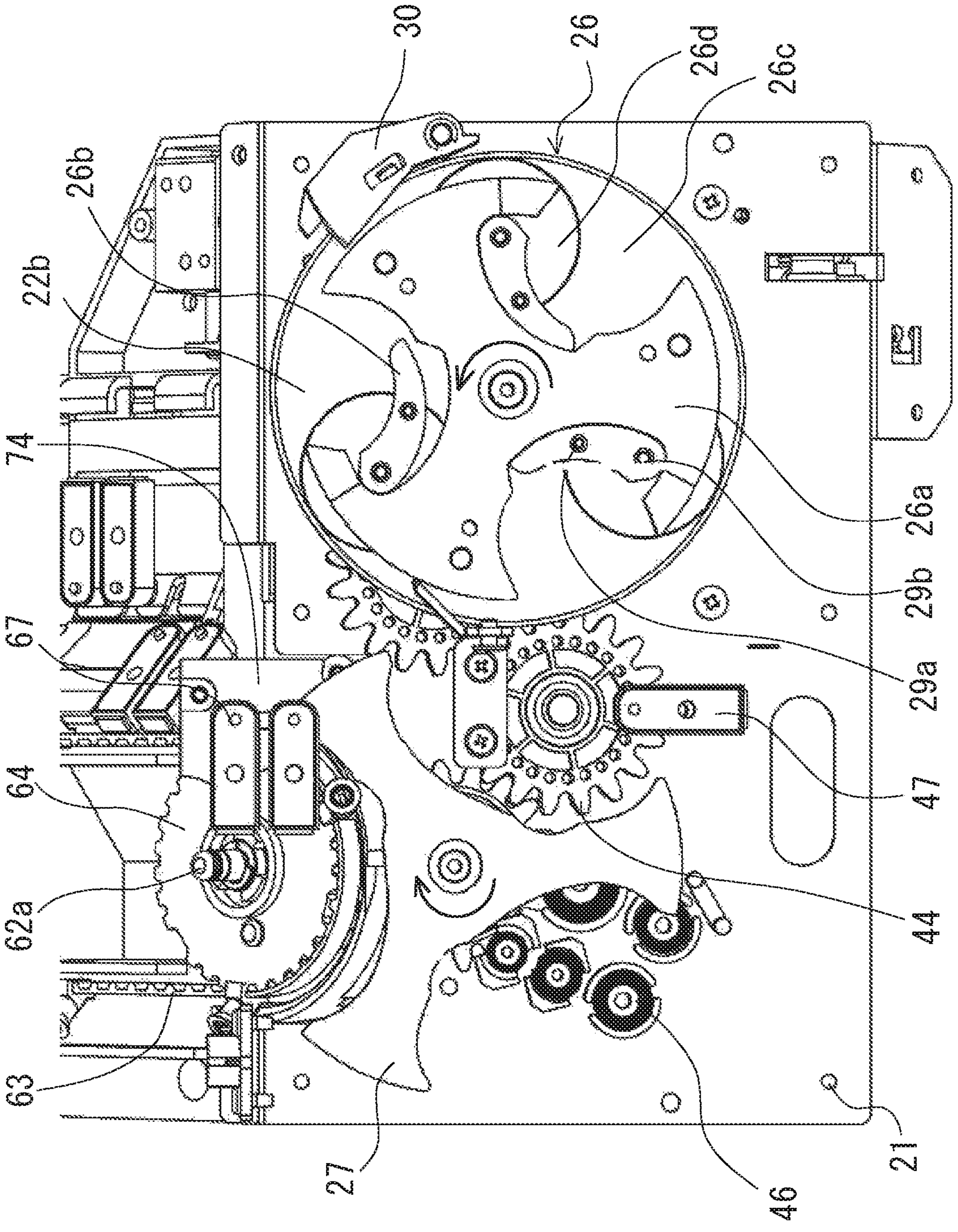
FIG. 13 is an enlarged explanatory view showing the structure of the coin separation and discrimination unit of the apparatus for discrimination and conveyance of coins of FIG. 1, in which the head, the substrate box, and a casing are detached.

A wiper rotation detection sensor 47 is provided on the surface of the base plate 21 for the purpose of detecting whether or not the rotary wiper 27 keeps rotating at a predetermined rotational frequency. In this embodiment, the sensor 47 is configured to detect optically the rotation of the driven gear 44. Specifically, as shown in FIG. 13, small holes are formed on the driven gear 44 in the circumferential direction at equal intervals and a known light emitting device is provided on the back side of the driven gear 44. The wiper rotation detection sensor 47 is configured to detect the light which passes through a designated one of the small holes from the light emitting device (see FIG. 13). Since the light passing though the designated small hole flashes on and off according to the rotation of the driven gear 44 when seeing from the surface side of the base plate 21, the rotational situation of the wiper 27 can be easily known by detecting this flashing light.

Figure 19A:
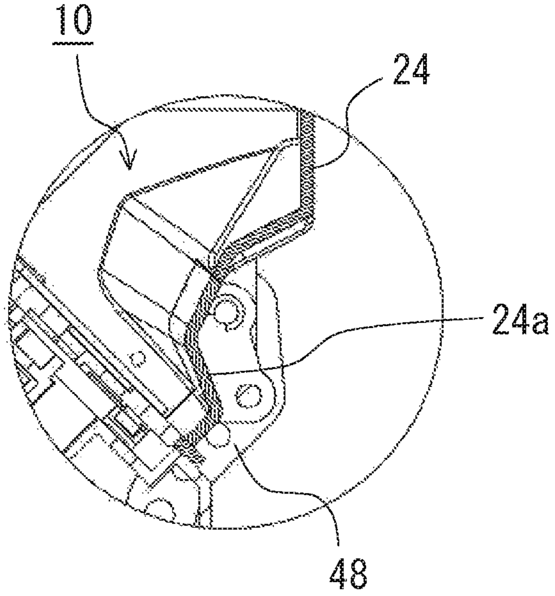
FIG. 19A is an explanatory cross-sectional view showing the situation where a coin or coins stored in the coin storing unit is/are returned in accordance with an ejecting action by a user in the apparatus for discrimination and conveyance of coins of FIG. 1, in which the state before the ejecting action is performed is shown.
Figure 19B:
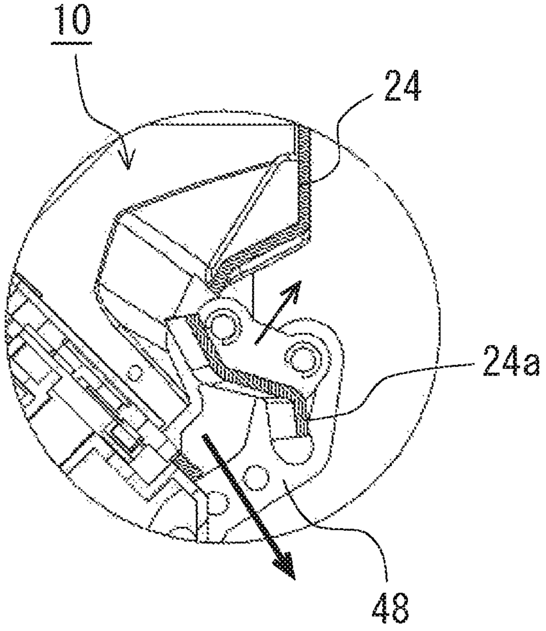
FIG. 19B is an explanatory cross-sectional view showing the situation where a coin or coins stored in the coin storing unit is/are returned in accordance with an ejecting action by a user in the apparatus for discrimination and conveyance of coins of FIG. 1, in which the state where a moving part of the head is opened after the ejecting action is performed is shown.

A residual quantity detection sensor 25, which is mounted on the side face of the head 24, is provided for detecting the residual quantity of coins C which are waiting for processing (i.e., the total number of the coins C retained in the coin storing unit 10 to wait for processing). The head 24 is not integrated with a substrate box 23. In addition, the head 24 comprises a moving part 24*a*, which is provided for returning a coin or coins C stored in the coin storing unit 10 in accordance with an ejecting operation by a user. Normally, the moving part 24*a* is closed, as shown in FIG. 19A. However, when an ejecting operation is applied, the moving part 24*a* is opened, as shown in FIG. 19B, and as a result, a coin or coins C is/are dropped through an opening formed by the moving part 24*a* to be returned. The opening and closing of the moving part 24*a* are detected by an opening/closing detection sensor (not shown) which is incorporated into the head 24.

A linking part 48, which is formed to protrude from the surface of the base plate 21, is a part for linking a solenoid 40 which is provided on the back side of the base plate 21 with the moving part 24*a* of the head 24. When the solenoid 40 is energized or deenergized, the linking part 48 is moved according to the reciprocating motion of the plunger of the solenoid 40. The moving part 24*a* is configured to be opened or closed according to the reciprocating motion of the solenoid 40. This means that the linking part 48 realizes a desired linking operation between the moving part 24*a* and the solenoid 40 regardless of whether the moving part 24*a* is opened or closed.

Next, the coin conveyance and distribution unit 60 will be explained below with reference to FIGS. 1 to 10.

Figure 8:
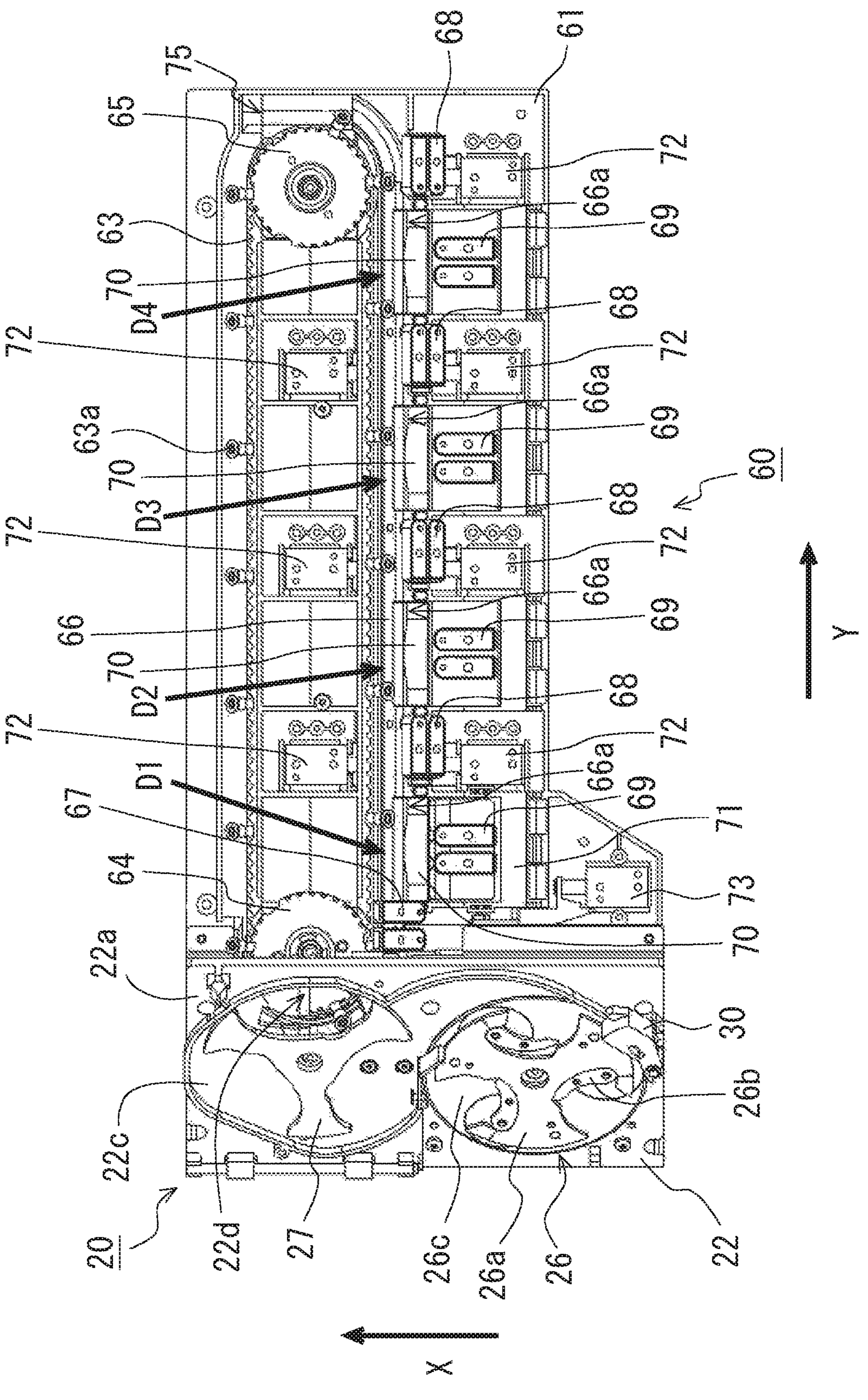
FIG. 8 is a plan view showing the overall structure of the apparatus for discrimination and conveyance of coins of FIG. 1, in which the rear and front covers, the head, and the substrate box are detached.

In this embodiment, as shown in FIGS. 1 and 8, the coin conveyance and distribution unit 60 comprises first to fourth distribution sections D1, D2, D3, and D4 which are arranged along the extending direction of this unit 60 from the side of the coin separation and discrimination unit 20. Eight coin ejection devices (not shown) are provided right below the first to fourth distribution sections D1, D2, D3, and D4 according to the eight denominations of coins C to be processed in this apparatus 1. Two of the eight coin ejection devices, one of which is placed at the front side and the other at the rear side, are assigned to each of the first to fourth distribution sections D1, D2, D3, and D4. Coins C are distributed by the first to fourth distribution sections D1, D2, D3, and D4 according to the respective denominations while being conveyed in the coin conveyance and distribution unit 60 in a predetermined conveyance direction indicated by an arrow in FIG. 1 and then, the coins C thus distributed are dropped naturally from the first to fourth distribution sections D1 to D4 into the corresponding coin ejection devices and stored therein.

As shown in FIGS. 1 to 8, the coin conveyance and distribution unit 60 comprises a body 61 that extends linearly in the coin conveyance direction. The body 61 is divided into an endless belt receiving section which is relatively high and disposed on the rear side, and a sensor and solenoid receiving section which is relatively low and disposed on the front side.

In the endless belt receiving section of the body 61, a pair of driven gears 64 and 65 which are arranged at a predetermined distance, an endless belt 63 which is stretched between the driven gears 64 and 65, and four distribution flap driving solenoids 72 are provided. The upper opening of the endless belt receiving section is covered with a rear cover 77. An inclined portion 77*a* (see FIG. 1) is formed in the front part of the rear cover 77, and a guide rail 66 is mounted near the lower end of the inclined portion 77*a*. The guide rail 66, which has a plan shape like a J character, is extended from the vicinity of the second delivering region P2 to an overflow path 75 which is disposed at the terminal of the endless belt receiving section. The guide rail 66 comprises four openings 66*a* that form gates 76*a* of the coin conveyance path 76 (see FIGS. 7 and 8). These four gates 76*a*, which are disposed at predetermined intervals, are respectively assigned to the first to fourth distribution sections D1, D2, D3, and D4.

In the sensor and solenoid receiving section of the body 61, an introducing coin sensor 67, four conveying coin sensors 68, four falling coin sensors 69, four distribution flap driving solenoids 72, and a reject flap driving solenoid 73 are provided. The upper opening of the sensor and solenoid receiving section is covered with a front cover 78. An inclined portion 78*a* is formed in the rear part of the front cover 78. The inclined portion 78*a* of the front cover 78 is overlapped with the inclined portion 77*a* of the rear cover 77 (see FIG. 1). The combination of these two inclined portions 77*a* and 78*a* and the guide rail 66 which is located near the lower end of the inclined portion 77*a* constitutes the coin conveyance path 76 in which coins C are conveyed in their standing state which is inclined with respect to a vertical plane. Thus, the cross section of the coin conveying path 76 is like an inclined U-shape. The coin conveying path 76, which has a plan shape like a J character, is extended from the vicinity of the second delivering region P2 to the overflow path 75. Here, the inclined portions 77*a* and 78*a* of the rear and front covers 77 and 78 have the same inclination angle of approximately 45° with respect to the bottom surface of the body 61. An inclined edge 61*a* of the body 61, which is disposed at the terminal side end of the body 61 (at the opposite end to the coin separation and discrimination unit 20), has an inclination angle of approximately 30° with respect to the bottom surface of the body 61. Accordingly, when (the coin conveyance and distribution unit 60 of) the apparatus 1 is placed horizontally, each coin C is conveyed on the coin conveying path 76 in the inclined state at approximately 45° with respect to the horizontal plane in the coin conveyance direction shown in FIG. 1 from the vicinity of the second delivering region P2 to the overflow path 75.

Engaging pins 63*a* are fixed to the endless belt 3, which extends along the guide rail 66 so as to be adjacent to the same, at equal intervals and therefore, coins C placed on the guide rail 66 are respectively engaged with any one of the pins 63*a* and pushed in the coin conveying direction according to the movement of the belt 63. As a result, the said coins C are successively conveyed on the guide rail 66.

In addition, the front cover 77 and the rear cover 78 are attached to the body 61 to cover the endless belt receiving section and the sensor and solenoid receiving section, in which the inclined portions 77*a* and 78*a* of the rear and front covers 77 and 78 constitute the two side walls of the coin conveyance path 76 respectively. Thus, coins C placed on the bottom (i.e., the guide rail 66) of the coin conveyance path 76 are moved in the coin conveyance direction while being sandwiched by the inclined portions 77*a* and 78*a*. As a result, there is no possibility that the coins C are dropped from the coin conveyance path 76 during conveyance.

In this embodiment, the four gates 76*a* are respectively provided in the coin conveying path 76 at the corresponding positions to the four openings 66*a* of the guide rail 66. These four gates 76*a* are respectively assigned to the first to fourth distribution sections D1 to D4. Each of these gates 76*a* comprises a distribution flap 70 which is driven by a corresponding one of the four distribution flap driving solenoids 72 placed in the sensor and solenoid receiving section of the body 61; thus, each gate 76*a* can be opened or closed by the corresponding flap 70.

When no voltage is applied to each of the solenoids 72, the corresponding distribution flap 70 in the first, second, third, or fourth distribution section D1, D2, D3, or D4 is kept closed. When a positive voltage is applied to each of the solenoids 72, the plunger of the corresponding solenoid 72 is moved in a first direction and as a result, the corresponding distribution flap 70 in the first, second, third, or fourth distribution section D1, D2, D3, or D4 is moved in a first rotational direction around a predetermined axis. In this state, the corresponding gate 76*a* is opened and the distributed coins C are stored in a corresponding one of the coin ejection devices provided below on the rear side of the said gate 76*a*. On the other hand, when a negative voltage is applied to each of the solenoids 72, the plunger of the corresponding solenoid 72 is moved in a second direction opposite to the first direction and as a result, the corresponding distribution flap 70 in the first, second, third, or fourth distribution section D1, D2, D3, or D4 is rotated in a second rotational direction opposite to the first rotational direction. In this state, the corresponding gate 76*a* is opened and the distributed coins C are stored in a corresponding one of the coin ejection devices provided below on the front side of the said gate 76*a*. In this way, coins C of two denominations are distributed and stored in the corresponding coin ejection devices by way of each of the four gates 76*a* and therefore, coins C of eight denominations can be distributed and stored in the eight coin ejection devices.

Next, the aforementioned constituent elements of the coin conveying and distribution unit 60 will be explained in detail below.

Figure 18:
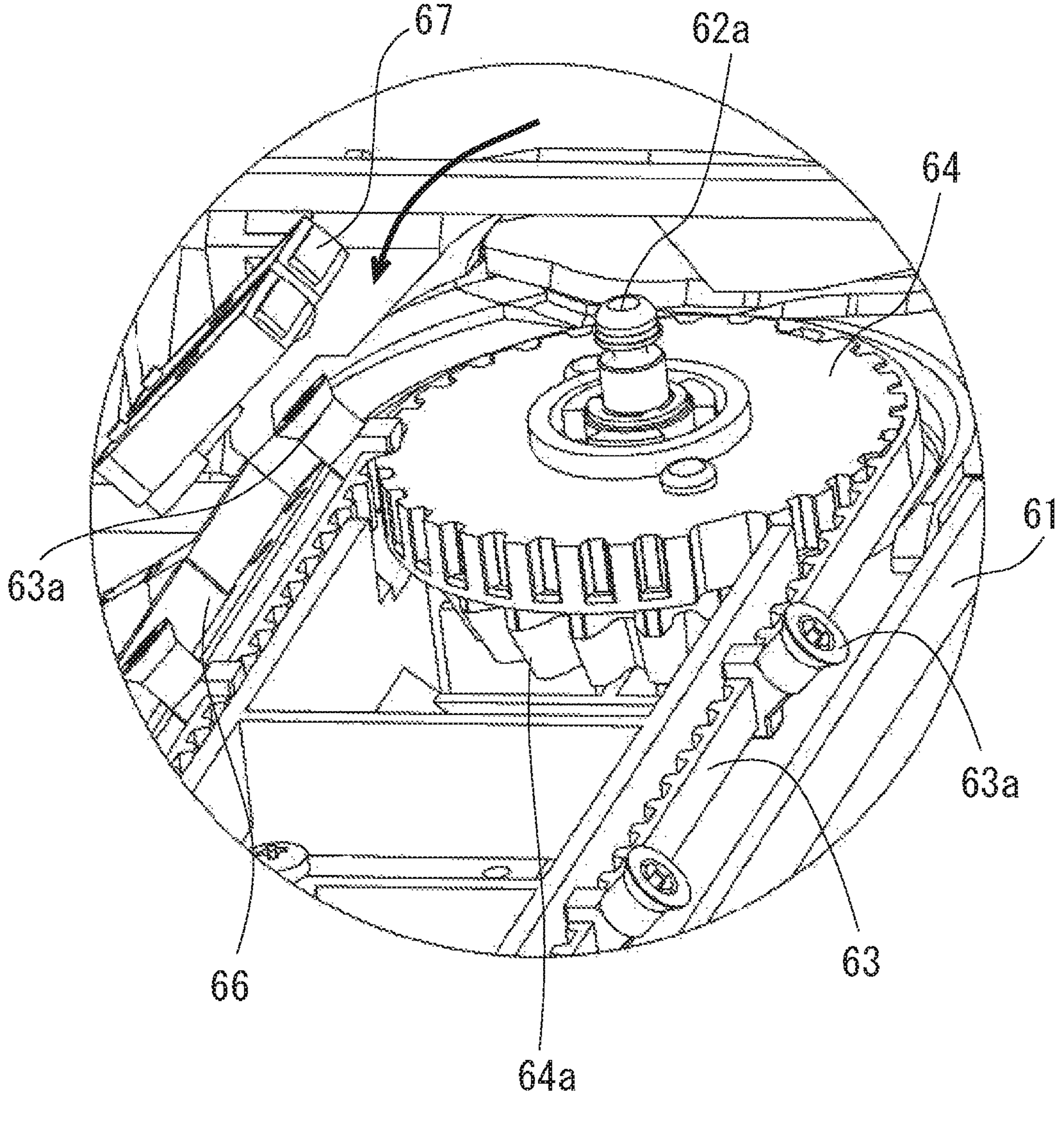
FIG. 18 is an enlarged explanatory view showing the structure of the second delivering region which is formed at the connecting part of the coin separation and discrimination unit and the coin conveyance and distribution unit in the apparatus for discrimination and conveyance of coins of FIG. 1.

The endless belt 63, which is provided in the endless belt receiving section of the body 61, comprises gear teeth and is stretched between the driven gears 64 and 65 which are fixed at the predetermined interval. The driven gears 64 and 65 are respectively supported by rotational axes 62*a* and 62*b* and respectively rotated around these axes 62*a* and 62*b*. The belt 63 is supported to be approximately horizontal by the driven gears 64 and 65. Since the driven gear 64 disposed near the coin separation and discrimination unit 20 is connected to the driven gear 45 disposed in the same unit 20 by way of a linking gear 64*a* (see FIG. 18) which is directly connected to the overlying driven gear 64, the driven gear 64 is rotationally driven by the electric motor 41 provided in the coin separation and discrimination unit 20. For this reason, the belt 63 is also rotationally driven by the motor 41 similar to the rotary disk 26 and the rotary wiper 27. The driven gear 64 may be rotationally driven by any other electric motor than the motor 41. As shown in FIG. 8, the pins 63*a* are fixed to the belt 63 at the predetermined intervals and thus, coins C are successively engaged with any one of these pins 63*a* and conveyed on the coin conveyance path 76 according to the traveling of the belt 63. Since the endless belt receiving section is covered with the rear cover 77, the belt 63 and the driven gears 64 and 65 are not seen from the outside.

Regarding the sensors provided in the sensor and solenoid receiving section of the body 61, the introducing coin sensor 67, the conveying coin sensors 68, and the falling coin sensors 69 are configured to conduct the following operations.

Figure 15:
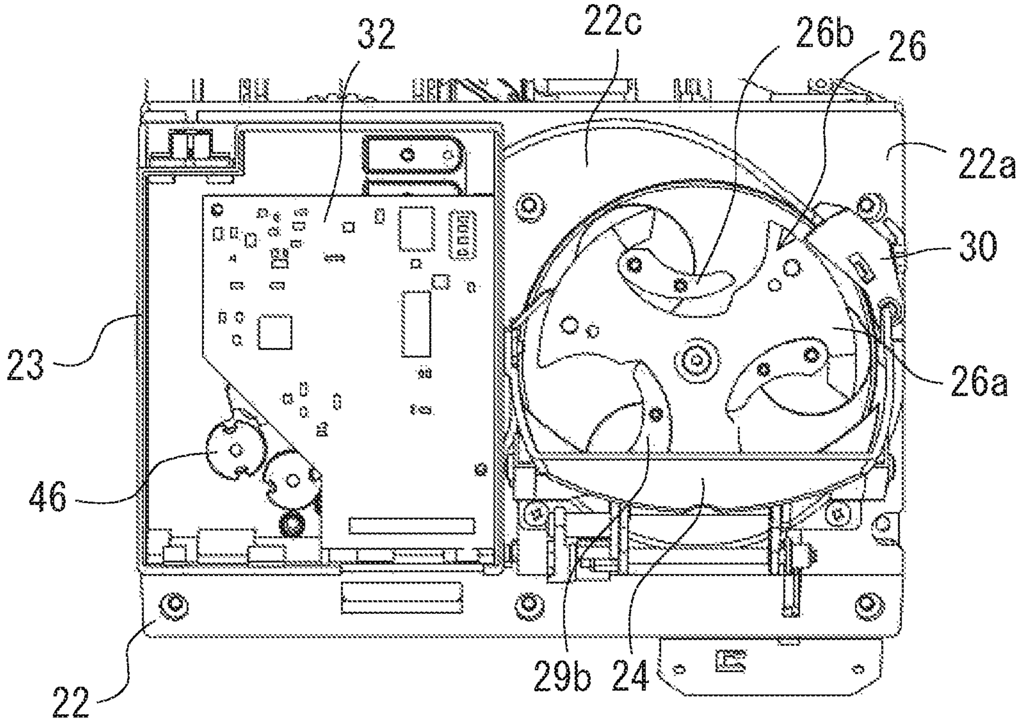
FIG. 15 is an explanatory view showing the structure of the coin separation and discrimination unit of the apparatus for discrimination and conveyance of coins of FIG. 1, in which a lid of the substrate box is detached.
Figure 16:
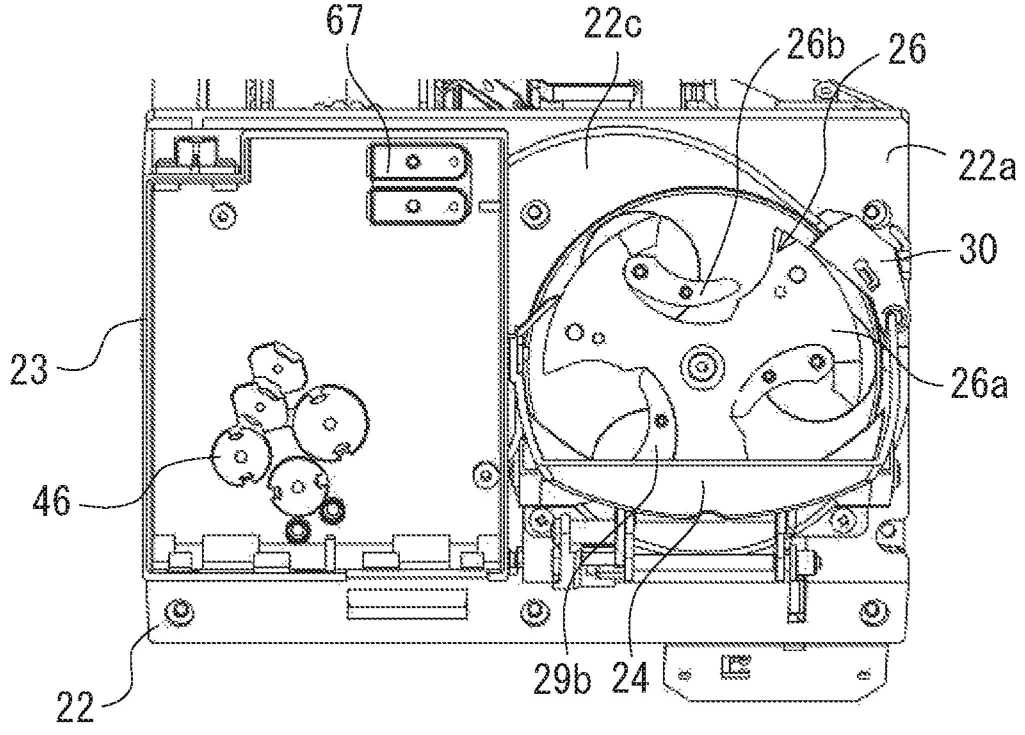
FIG. 16 is an explanatory view showing the structure of the coin separation and discrimination unit of the apparatus for discrimination and conveyance of coins of FIG. 1, in which a control substrate provided in the substrate box is detached.

The introducing coin sensor 67, which is disposed at the starting end of the coin conveyance path 76 (or the guide rail 66), detects the presence or absence of the introduction of a coin C into the path 76 and the introduction timing when the introduction of a coin C is present. By the output signal of the introducing coin sensor 67, a control device (a control program) of the apparatus 1 for discrimination and conveyance of coins, which is mounted on a control substrate 32 (see FIGS. 15 and 16) disposed in the substrate box 23 of the coin separation and discrimination unit 20, can know the presence or absence of the introduction of a coin C into the path 76 and the introduction timing when the introduction of a coin C is present.

The four conveying coin sensors 68, which are arranged along the coin conveying path 76 at the predetermined intervals (here, at equal intervals), are respectively disposed at the positions immediately after the four gates 76*a* of the first to fourth distribution sections D1, D2, D3, and D4. Each of the four conveying coin sensors 68 detects the presence or absence of the conveyance of a coin C at the corresponding gate 76*a* of the first, second, third, or fourth distribution section D1, D2, D3, or D4, and the conveyance timing when the conveyance of a coin C is present. By the output signal of each conveying coin sensor 68, the control device (the control program) of the apparatus 1 (which is mounted on the control substrate 32) can know the presence or absence of the conveyance of a coin C at the position immediately after the corresponding gate 76*a* of the first, second, third, or fourth distribution section D1, D2, D3, or D4, and the conveyance timing when the conveyance of a coin C is present.

The four falling coin sensors 69, which are arranged along the coin conveying path 76 at the predetermined intervals (here, at equal intervals) to be slightly apart forward from the coin conveying path 76, are respectively disposed at the positions right above four distribution paths 79 which lead to the four gates 76*a* of the first to fourth distribution sections D1, D2, D3, and D4. Each of the falling coin sensors 69 detects the presence or absence of the falling of a coin C through the corresponding gate 76*a* of the first, second, third, or fourth distribution section D1, D2, D3, or D4 when the said gate 76*a* is opened and the number of the falling coins C when the falling of a coin C is present. By the output signal of each falling coin sensor 69, the control device (the control program) of the apparatus 1 can know the presence or absence of the falling of a coin C through the corresponding gate 76*a* of the first, second, third, or fourth distribution section D1, D2, D3, or D4, and the number of the falling coins C when the falling of a coin C is present.

Regarding the solenoids provided in the sensor and solenoid receiving section of the body 61, the four distribution flap driving solenoids 72 and the reject flap driving solenoid 73 are configured to conduct the following operations.

Figure 4:
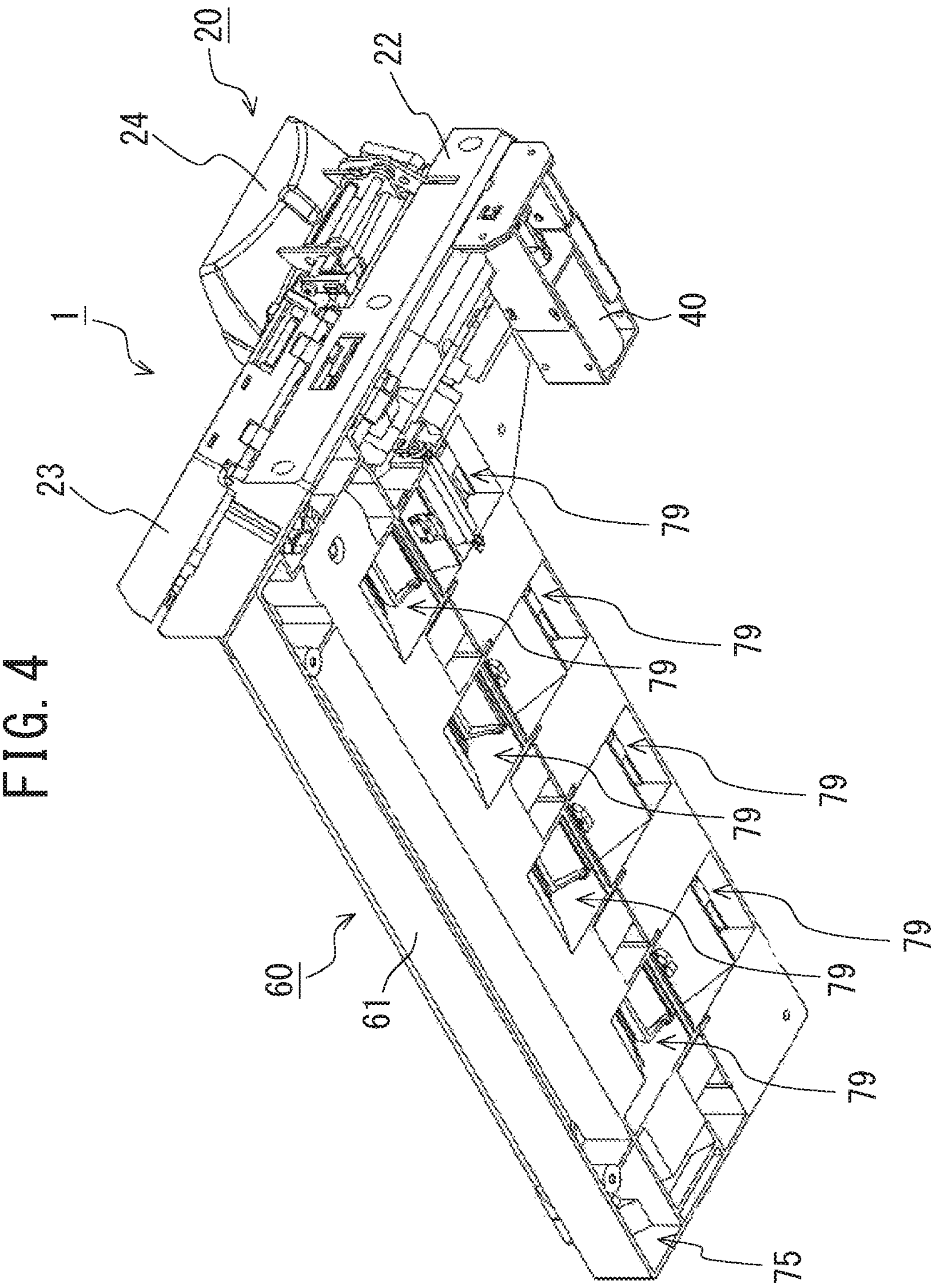
FIG. 4 is a perspective view showing the overall structure of the apparatus for discrimination and conveyance of coins of FIG. 1, which is seen obliquely upward from the lower left rear.
Figure 5:
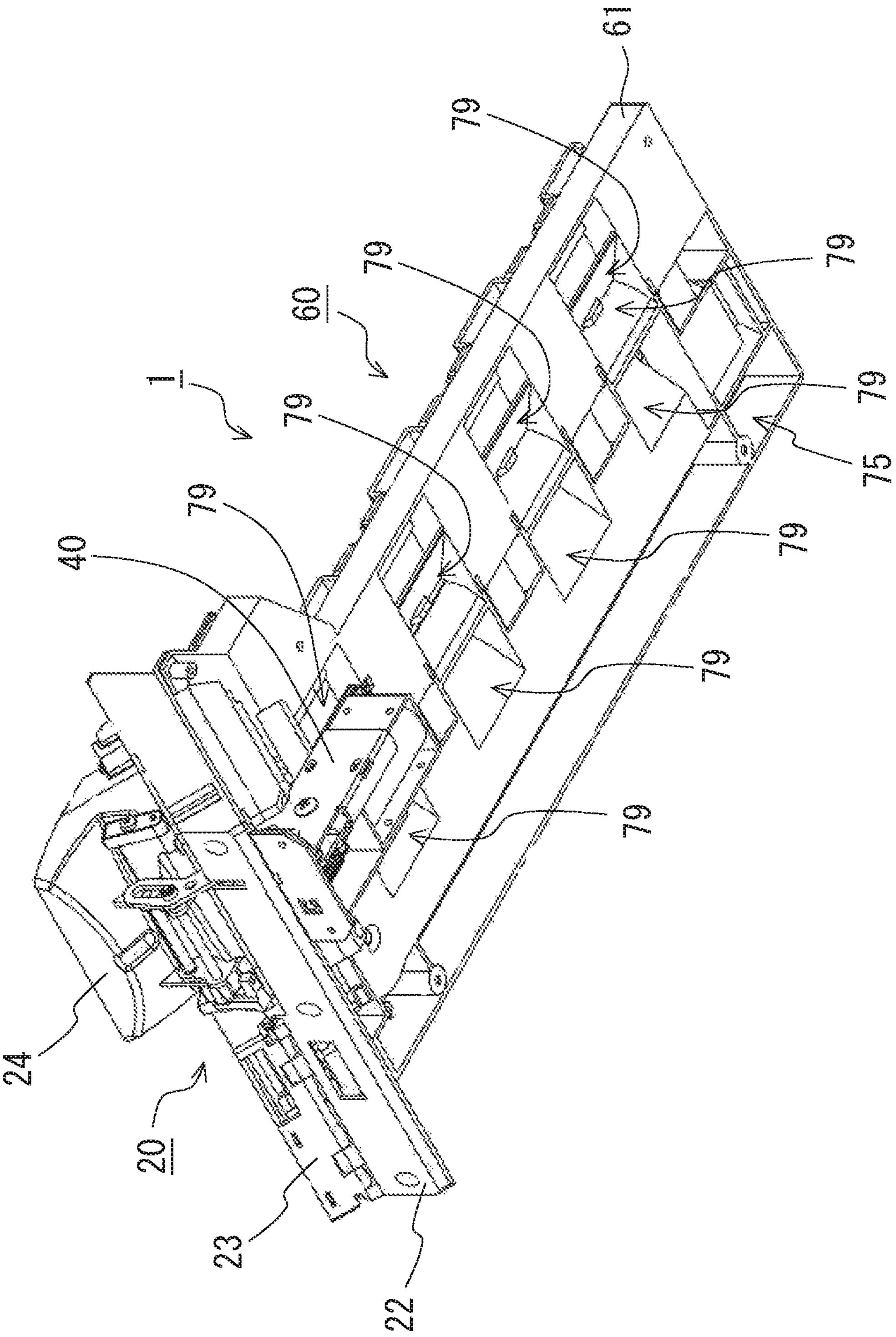
FIG. 5 is a perspective view showing the overall structure of the apparatus for discrimination and conveyance of coins of FIG. 1, which is seen obliquely upward from the lower left front.
Figure 6:
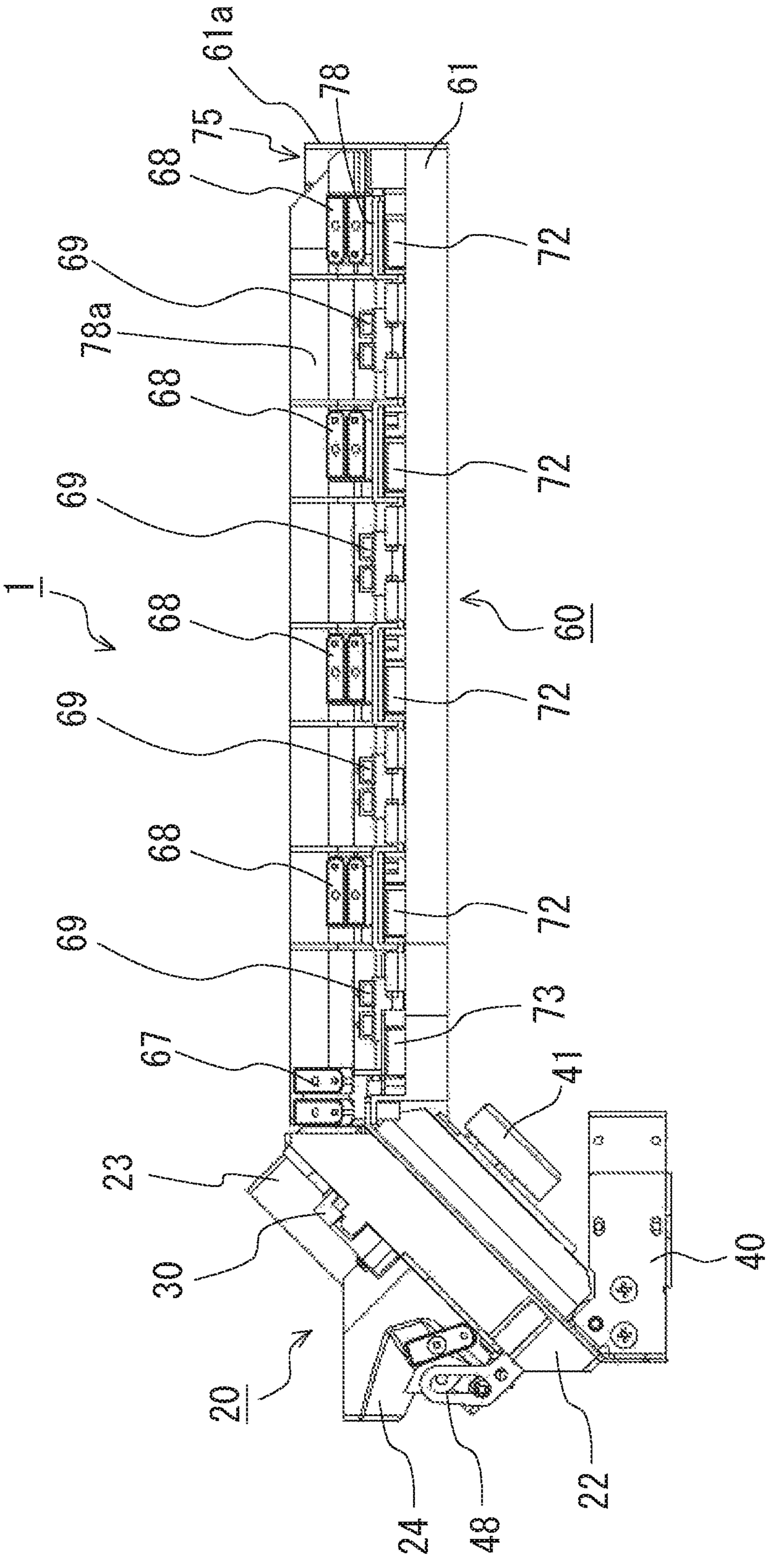
FIG. 6 is a front view showing the overall structure of the apparatus for discrimination and conveyance of coins of FIG. 1.
Figure 7:
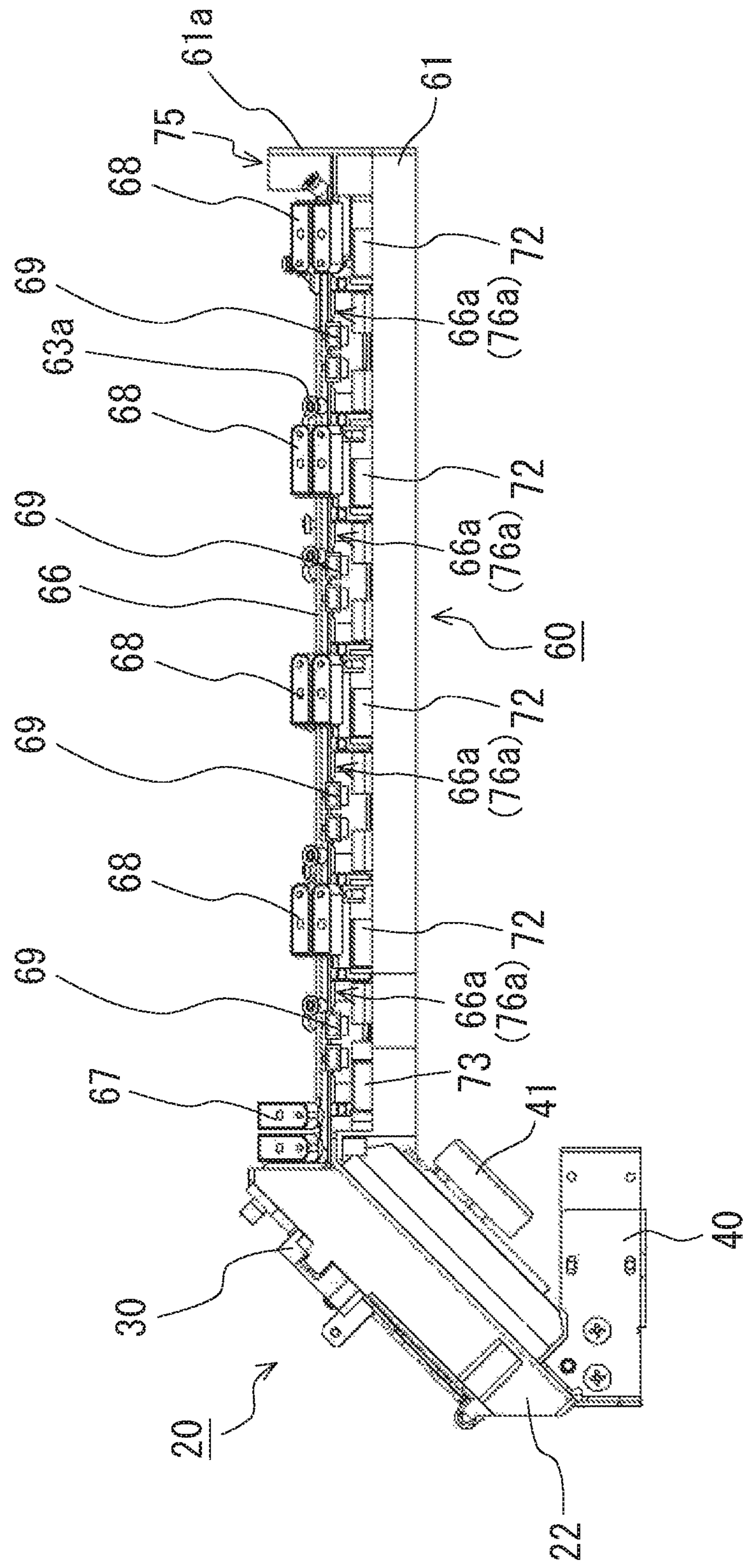
FIG. 7 is a front view showing the overall structure of the apparatus for discrimination and conveyance of coins of FIG. 1, in which a rear cover that covers an upper opening of an endless belt receiving section of a coin conveyance and distribution unit, a front cover that covers an upper opening of a sensor and solenoid receiving section of the same unit, a head, and a substrate box are detached.

The four distribution flap driving solenoid 72 are respectively provided for driving the four distribution flaps 70 to open and close the four gates 76*a* of the first to fourth distribution sections D1 to D4. Each of the distribution flaps 70, which is disposed in the corresponding gate 76*a*, distributes coins C of two predetermined denominations into the corresponding two coin ejection devices (not shown) which are attached to the bottom of the body 61. As shown in FIGS. 4 and 5, the eight distribution paths 79 in total are formed in the sensor and solenoid receiving section of the body 61. Each of the distribution paths 79 has an opening at the bottom of the body 61, which are clearly shown in FIGS. 4 and 5. Each of the distribution paths 79 has another opening (not shown) connected to the corresponding gate 76*a* of the first, second, third, or fourth distribution section D1, D2, D3, or D4.

As already explained above, when no voltage is applied to each of the distribution flap driving solenoids 72, the corresponding distribution flap 70 in the corresponding gate 76*a* of first, second, third, or fourth distribution section D1, D2, D3, or D4 is kept closed. When a positive voltage is applied to each of the solenoids 72, the plunger of the corresponding solenoid 72 is moved in the first direction and as a result, the corresponding distribution flap 70 in the first, second, third, or fourth distribution section D1, D2, D3, or D4 is moved in the first rotational direction around the predetermined axis. In this state, the corresponding gate 76*a* is opened and the distributed coins C are stored in the coin ejection device provided on the rear side of the said gate 76*a*. On the other hand, when a negative voltage is applied to each of the solenoids 72, the plunger of the corresponding solenoid 72 is moved in the second direction opposite to the first direction and as a result, the corresponding distribution flap 70 in the first, second, third, or fourth distribution section D1, D2, D3, or D4 is rotated in the second rotational direction opposite to the first rotational direction. In this state, the corresponding gate 76*a* is opened and the distributed coins C are stored in the other coin ejection device provided on the front side of the said gate 76*a*. In this way, coins C of two denominations are distributed and stored in the corresponding two coin ejection devices by way of each gate 76*a*. Accordingly, coins C of the predetermined eight denominations can be distributed and stored in the eight coin ejection devices, respectively, using the four distribution flap driving solenoids 72.

The rejection flap driving solenoid 73 is provided for driving a rejection flap 71 (see FIG. 9) to open and close a rejection gate (not shown) which is provided in or near the first distribution section D1. The rejection flap 72, which is disposed in the rejection gate, distributes selectively rejecting coins C which are judged not to be processed (e.g., counterfeit coins) by the coin separation and discrimination unit 20 into a coin storing container (not shown) which is provided for storing the rejecting coins C. A dedicated rejection path (not shown) is formed in the sensor and solenoid receiving section of the body 61. The rejection path has an opening at the bottom of the body 61. The rejection path has another opening (not shown) connected to the rejection gate.

When no voltage is applied to the rejection flap driving solenoid 73, the rejection flap in the rejection gate is kept closed. When a voltage is applied to the solenoid 73, the plunger of the solenoid 73 is moved and as a result, the rejection flap is moved in a predetermined rotational direction around a predetermined axis. In this state, the rejection gate is opened and thus, the rejecting coins C are stored in the coin storing container.

The overflow path 75, which is disposed at the terminal end of the endless belt receiving section of the body 61 (see FIG. 1), is provided for discharging and collecting overflowed coins C, that is, coins C that exceed the corresponding storage limits of the eight coin ejection devices attached to the bottom of the body 61 and/or coins C that are instructed to be discharged by the control device of the apparatus 1. Since the overflow path 75 has an opening which is formed at the bottom surface of the coin conveyance and distribution unit 60 (see FIG. 4), the overflowed coins C are quickly sent to a predetermined dispensing tray (not shown) to be returned to users. The judgement whether coins C are overflowed or not and the coin discharging process when coins C are judged overflowed are controlled by a control device (a control program) mounted on a main apparatus (e.g., a coin depositing/dispensing apparatus) into which the apparatus 1 is incorporated. Unlike this, only the processes in the coin discrimination section of the coin separation and discrimination unit 20 are controlled by the control device (the control program) which is mounted on the control substrate 32 provided in the substrate box 23 of the apparatus 1.

Figure 17:
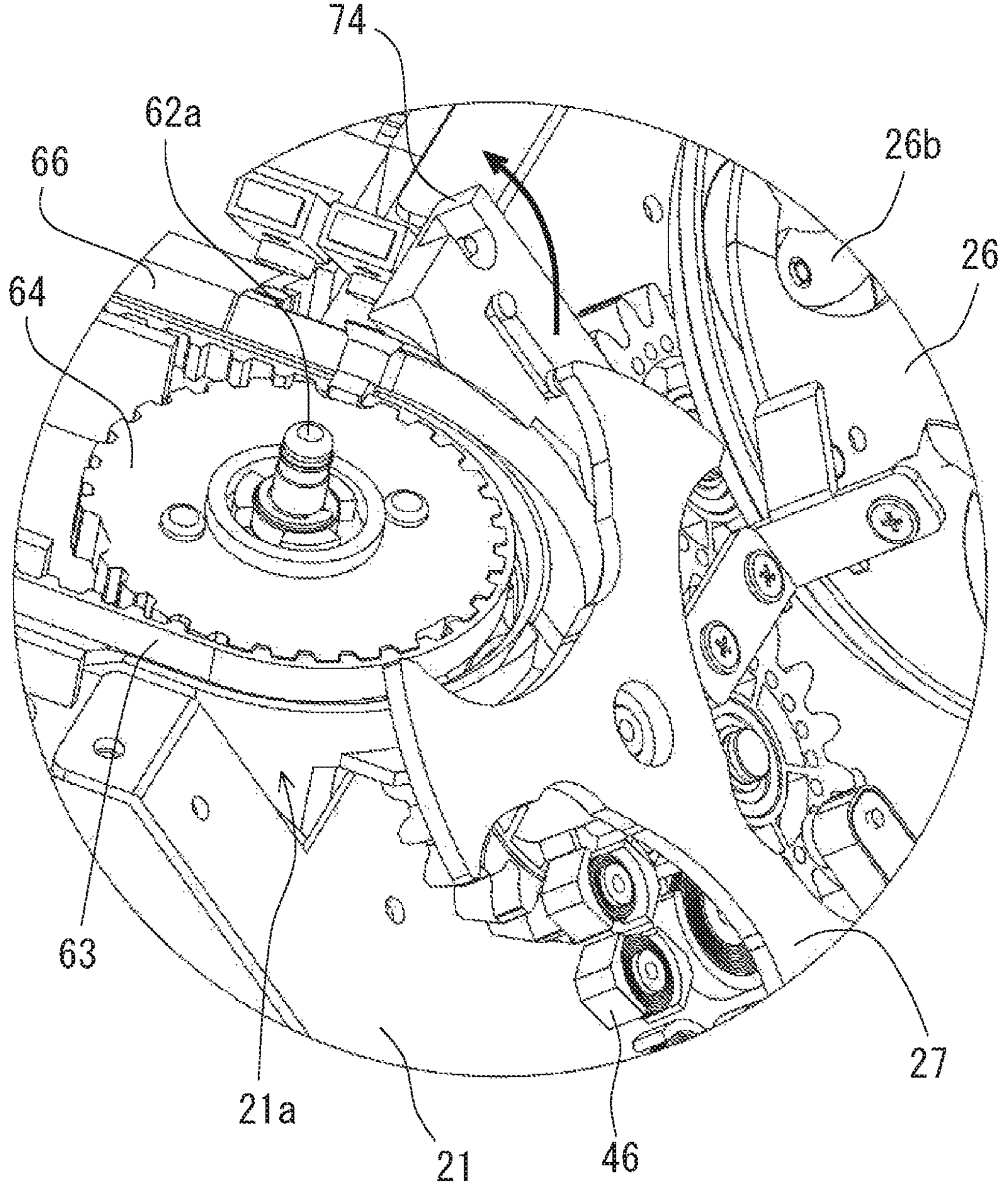
FIG. 17 is an enlarged explanatory view showing the structure of the second delivering region which is formed at the connecting part of the coin separation and discrimination unit and the coin conveyance and distribution unit in the apparatus for discrimination and conveyance of coins of FIG. 1.

As shown in FIGS. 9 and 17, a plate-shaped direction changing member 74 is provided near the starting end of the coin conveyance path 76. The direction changing member 74 is a member that is used for changing the moving direction of coins C which have passed through the second delivering region P2 to go to the outside of the coin separation and discrimination unit 20 in order for the said coins C to correctly arrive at the starting end of the coin conveyance path 76 to enter the same. To enable the smooth transition of coins C to the coin conveying path 76 from the coin separation and discrimination unit 20, the starting end of the guide rail 66 and that of the inclined portion 77*a* of the rear cover 77 are disposed near the exit of the second delivering region P2 (which includes the through hole 22*d* of the casing 22 and the opening 21*a* of the base plate 21). At the exit of the second delivering region P2, the moving direction of the coins C is diagonally downward with respect to the upper wall 22*a* of the casing 22 and the base plate 21 and away from the upper wall 22*a* and the base plate 21 due to the rotational driving force of the rotary wiper 27 and the gravity. On the other hand, the opening of the starting end (i.e., the entrance) of the coin conveyance path 76 is pointed to a direction perpendicular to the upper wall 22*a* and the base plate 21 and therefore, the moving direction of the coins C and the direction of the entrance of the path 76 have a large difference. This means that it is difficult for the coins C to enter the entrance of the path 76 from the exit of the second delivering region P2 surely and smoothly without changing the moving direction of the coins C. Accordingly, by mounting or providing the direction changing member 74 at the part between the exit of the second delivering region P2 and the entrance of the coin conveying path 76, i.e., the connecting part of the second delivering region P2 and the coin conveying path 76, the moving direction of the coins C that are delivered from the second delivering region P2 is forcibly changed, thereby enabling the coins C to surely enter the entrance of the coin conveyance path 76. In this way, the coins C that are delivered from the second delivering region P2 can be introduced into the entrance of the path 76 surely and smoothly and as a result, the coins C can be conveyed by the endless belt 63 in the coin conveyance and distribution unit 60 in spite of the moving direction of the coins C being changed by approximately 90°.

Next, the relationship between the moving direction of coins C in the coin separation and discrimination unit 20 and that in the coin conveyance and distribution unit 60 will be explained below.

As dearly understood from the aforementioned explanation, the coin separation section using the rotary disk 26 and the coin discrimination section using the rotary wiper 27, which are combined together to form the coin separation and discrimination unit 20 in this embodiment, are mounted on the flat surface of the upper wall 22*a* of the casing 22. Coins C are separated from each other while being rotated by the rotary disk 26 in the coin separation section and thereafter, the coins C thus separated are delivered to the coin discrimination section by way of the first delivering region P1 in the predetermined attitude, in other words, in the standing state which is inclined along the upper wall 22*a*. In the coin discrimination section, the coins C thus delivered are subject to discrimination in denomination and authenticity while being rotated by the rotary wiper 27 and thereafter, the coins C thus discriminated are delivered to the coin conveyance and distribution unit 60 by way of the second delivering region P2. Accordingly, it is apparent that these two processes, i.e., the separation process and the discrimination process, are carried out on the flat surface of the upper wall 22*a* while rotating the coins C to be processed on the same surface. Moreover, it is also apparent that the delivering action of the coins C to the coin discrimination section from the coin separation section is conducted in an approximately horizontal direction on the upper wall 22*a*. Accordingly, it is understood that the two processes of the coin separation and discrimination unit 20 are carried out while moving the coins C along a plane which contains the flat surface of the upper wall 22*a* in an approximately horizontal direction.

Here, when seeing the moving state or flow of the coins C in the coin separation and discrimination unit 20 macroscopically, it can be said that the two processes of the coin separation and discrimination unit 20 are carried out while moving the coins C in the upward direction X which is indicated by an up arrow in FIG. 8 in a horizontal plane, in other words, the moving direction of the coins C during the processes of the coin separation and discrimination unit 20 is the upward direction X indicated by the up arrow in FIG. 8.

On the other hand, in the coin conveyance and distribution unit 60, the linear coin conveyance path 76, which is formed using the guide rail 66 and the inclined portions 77*a* and 78*a* of the rear and front covers 77 and 78, is extended along the longitudinal axis of the body 61 in an approximately horizontal plane. Coins C to be processed are subjected to the distribution process according to the predetermined denominations and the discharge process for the (inappropriate) coins C to be rejected while being conveyed on the coin conveyance path 76 and then, the coins C thus subjected in this way are moved downward from the path 76.

Accordingly, when seeing the moving state or flow of the coins C in the coin conveyance and distribution unit 60 macroscopically, it can be said that the two processes of the coin distribution and the rejecting coin discharge in the coin conveyance and distribution unit 60 are carried out while moving the coins C in the rightward direction Y which is indicated by a rightward arrow in FIG. 8 in the horizontal plane, in other words, the moving direction of the coins C during the processes of the coin conveyance and distribution unit 60 is the rightward direction Y indicated by the rightward arrow in FIG. 8.

Since the aforementioned directions X and Y are perpendicular in the horizontal plane, it can be said that the macroscopic moving direction (i.e., the X direction) of the coins C in the coin separation and discrimination unit 20 and the macroscopic moving direction (i.e., the Y direction) of the coins C in the coin conveyance and distribution unit 60 have an orthogonal relationship to each other. As a result, there arises an advantage that the overall length of the apparatus 1 for discrimination and conveyance of coins according to the embodiment of the present invention in the Y direction can be reduced compared with the conventional one where the macroscopic moving direction of the coins C in the coin separation and discrimination unit 20 and that in the coin conveyance and distribution unit 60 do not have an orthogonal relationship. This is due to the following reason.

Specifically, in the coin separation and discrimination unit 20, the rotary disk 26 is used for coin separation and the rotary wiper 27 is used for coin discrimination and furthermore, the processing surface of the coin separation section and that of the coin discrimination section are formed on the flat surface of the upper wall 22*a* and are disposed adjacent to each other. Accordingly, the length L20 of the coin separation and discrimination unit 20 in the direction along the long sides of the flat surface of the upper wall 22*a* in the horizontal plane (in other words, the length L20 of the unit 20 in the X direction in FIG. 8) is approximately equal to the sum obtained by adding the width of the first delivering region P1 to the sum of the diameter of the disk 26 and the diameter of the wiper 27. This means that it is inevitable that the length L20 of the unit 20 in the X direction has a considerably large value.

On the other hand, the depth, i.e., the depth D20 of the coin separation and discrimination unit 20 in the direction perpendicular to the long sides of the flat surface of the upper wall 22*a* in the horizontal plane (in other words, the depth D20 of the unit 20 in the Y direction in FIG. 8) is restricted to a small value. This is because both of the disk 26 and the wiper 27 themselves are flat and thin and because the depth of the unit 20 in the Y direction is restricted to a small value even if the inclination angle of the upper wall 22*a* and the driving mechanism for the disk 26 and the wiper 27 are taken into consideration.

As a result, in summary, the coin separation and discrimination unit 20 has the feature that the length L20 of the unit 20 in the X direction is relatively large and the depth D20 of the unit 20 in the Y direction is relatively small and that the ratio (L20/D20) of the length L20 to the depth D20 is very small. Accordingly, in the apparatus 1 of the embodiment of the present invention in which the coin separation and discrimination unit 20 and the coin conveyance and distribution unit 60 are arranged to have an orthogonal relationship, the total length L1 in the Y direction of the apparatus 1 is given as the sum (D20+L60) of the depth D20 of the unit 20 and the length L60 of the unit 60. Unlike this, in the conventional layout where the two units 20 and 60 are arranged tin the same direction (i.e., the Y direction), the total length L0 in the Y direction of the conventional layout is given as the sum (L20+L60) of the length L20 of the unit 20 and the length L60 of the unit 60. It is apparent that the former is considerably smaller in value than the latter, i.e., (D20+L60)<<(L20+L60). This fact contributes downsizing of the apparatus 1.

Furthermore, with the apparatus 1 for coin discrimination and conveyance of coins according to the embodiment o the present invention, it is sufficient that the coin separation and discrimination unit 20 and the coin conveyance and distribution unit 60 are arranged or combined to have an orthogonal relationship, and that the through hole 22*d* of the upper wall 22*a* and the opening 21*a* of the base plate 21 are respectively formed and at the same time, the direction changing member 74 is mounted near the starting end of the coin conveyance path 76 of the coin conveyance and distribution unit 60, the apparatus 1 can be realized with a simple and low-cost structure compared with the aforementioned conventional apparatuses of the same type.

Operation of Apparatus for Discrimination and Conveyance of Coins

Next, the operation of the apparatus 1 for coin discrimination and conveyance of coins according to the embodiment of the present invention will be explained below with reference to FIGS. 14A to 14O.

Figure 14A:
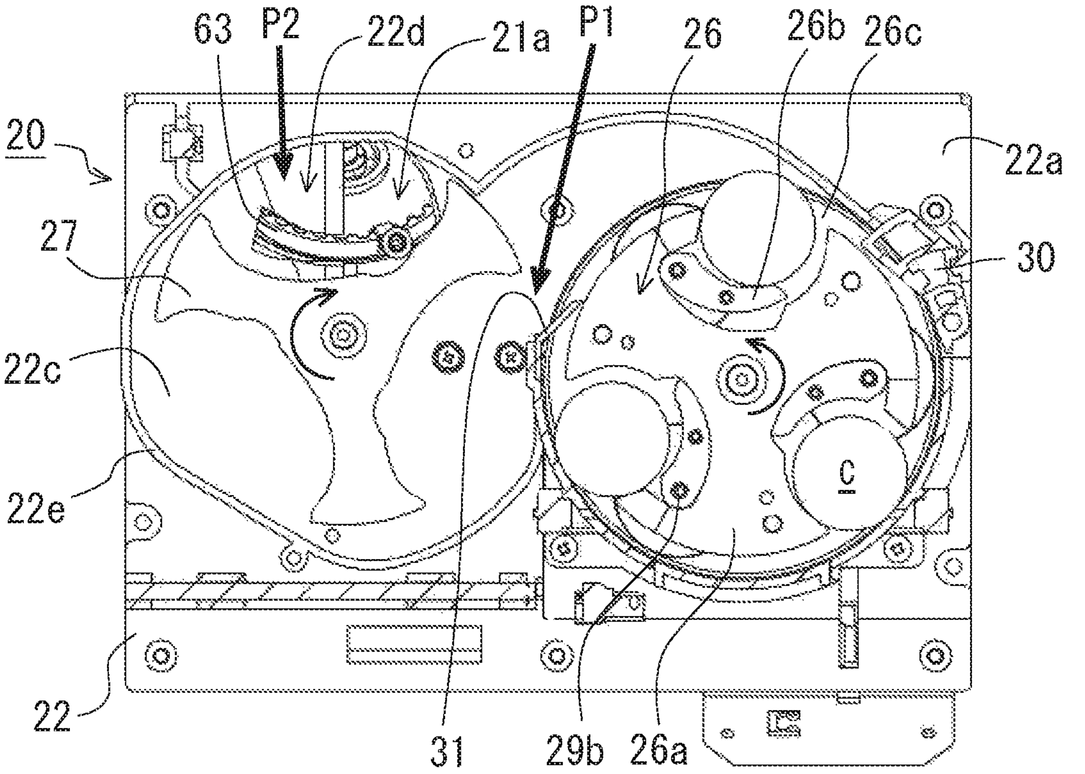
FIG. 14A is an explanatory view showing the coin feeding operation of the coin separation and discrimination unit of the apparatus for discrimination and conveyance of coins of FIG. 1, in which the head and the substrate box are detached.

First, as shown in FIG. 14A, it is supposed that three coins C (which are respectively termed first to third coins) are introduced into the coin separation section of the coin separation and discrimination unit 20. Since the coin separation section is structured in such a way that coins C stored in the coin storing unit 10 enter the three engaging recesses 26*c* one by one, such the state as described here is easily realized.

Figure 14B:
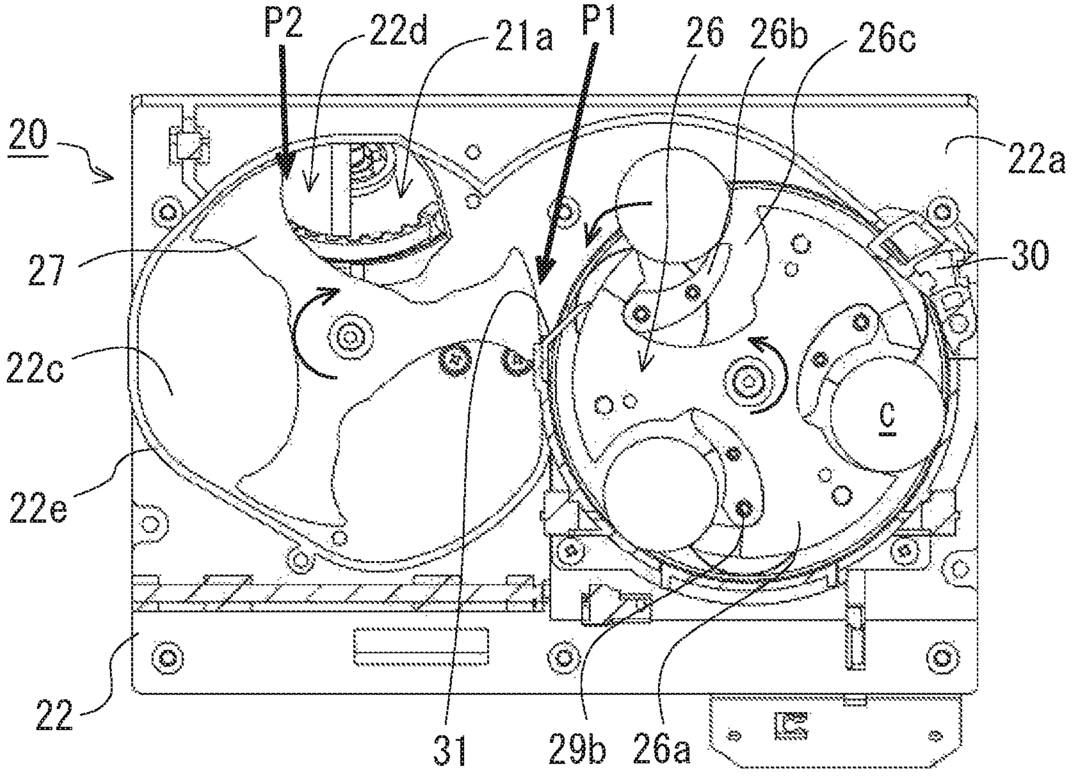
FIG. 14B is an explanatory view showing the coin feeding operation of the coin separation and discrimination unit of the apparatus for discrimination and conveyance of coins of FIG. 1, in which the head and the substrate box are detached, which is subsequent to FIG. 14A.

When the rotary disk 26 is further rotated from the state in FIG. 14A to arrive at a position where the first coin C has gone beyond the uppermost position of the disk 26 slightly, the relevant pushing member 26*b* which is adjacent to the first coin C is moved around the relevant rocking shaft 29*b*, thereby pushing the first coin C outward from the relevant engaging recess 26*c*. FIG. 14B shows this state.

Figure 14C:
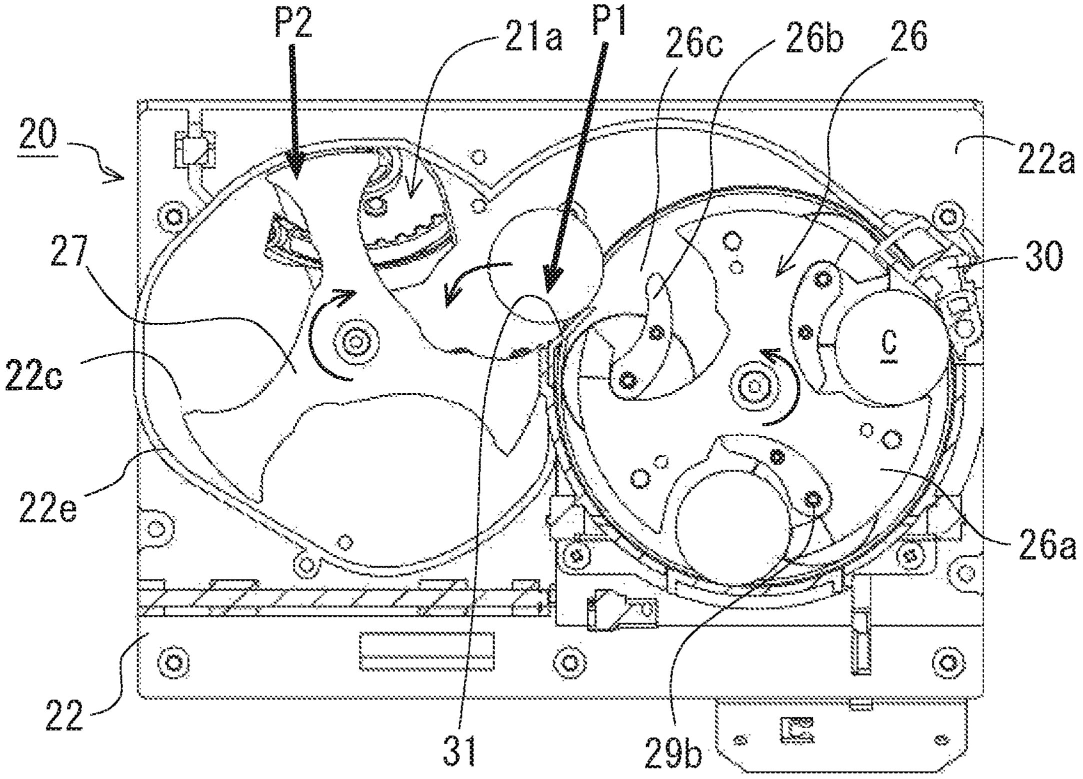
FIG. 14C is an explanatory view showing the coin feeding operation of the coin separation and discrimination unit of the apparatus for discrimination and conveyance of coins of FIG. 1, in which the head and the substrate box are detached, which is subsequent to FIG. 14B.
Figure 14D:
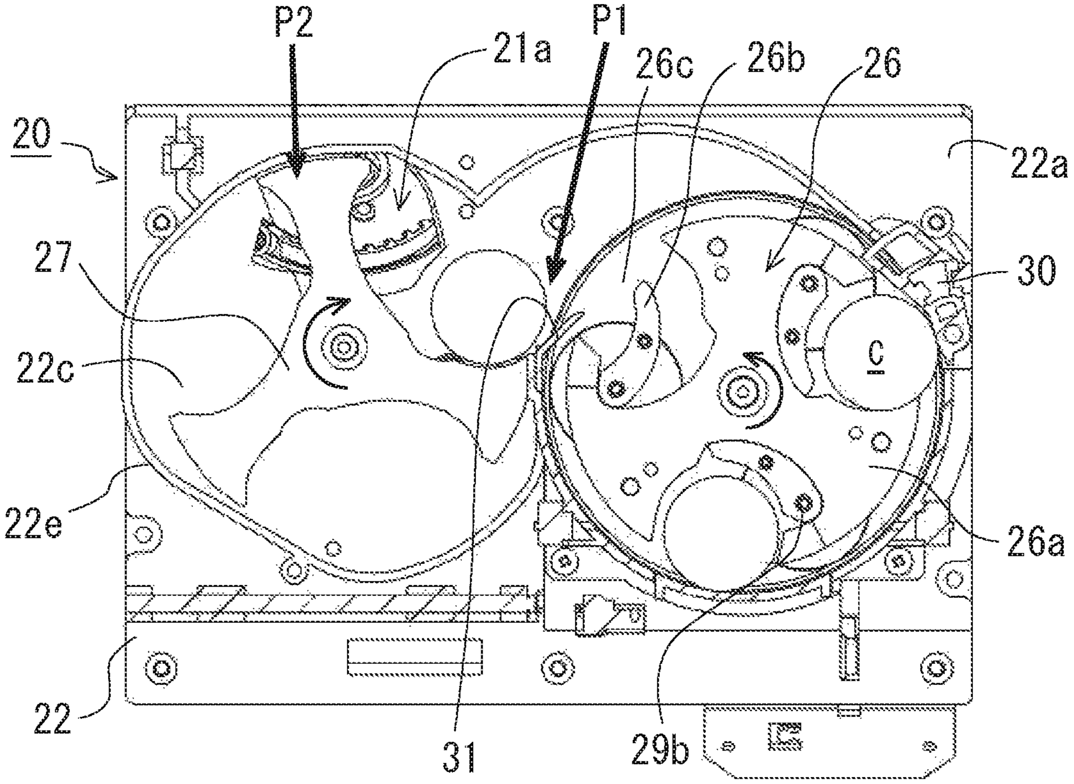
FIG. 14D is an explanatory view showing the coin feeding operation of the coin separation and discrimination unit of the apparatus for discrimination and conveyance of coins of FIG. 1, in which the head and the substrate box are detached, which is subsequent to FIG. 14C.

Following this, as shown in FIG. 14C, when the first coin C is pushed out from the relevant engaging recess 26*c* by the pushing action of the relevant pushing member 26*b* at the position where the said coin C has gone beyond the uppermost position of the disk 26 slightly, the said coin C is contacted with the delivering direction regulation member 31 which is fixed to the upper wall 22*a* of the casing 22 and as a result, the moving direction of the said coin C is regulated to a direction toward the coin discrimination section. Consequently, the said coin C is forcibly moved to the side of the coin discrimination section. Furthermore, since the said coin C is kept falling at this stage due to the gravity, the said coin C is received by one of the three arms of the rotary wiper 27 which is disposed at the closest position, as shown in FIG. 14D. At this stage, the said coin C is contacted with the upstream side edge of the closest-positioned arm. In this way, the said coin C is surely delivered to the coin discrimination section from the coin separation section by way of the first delivering region P1.

Figure 14E:
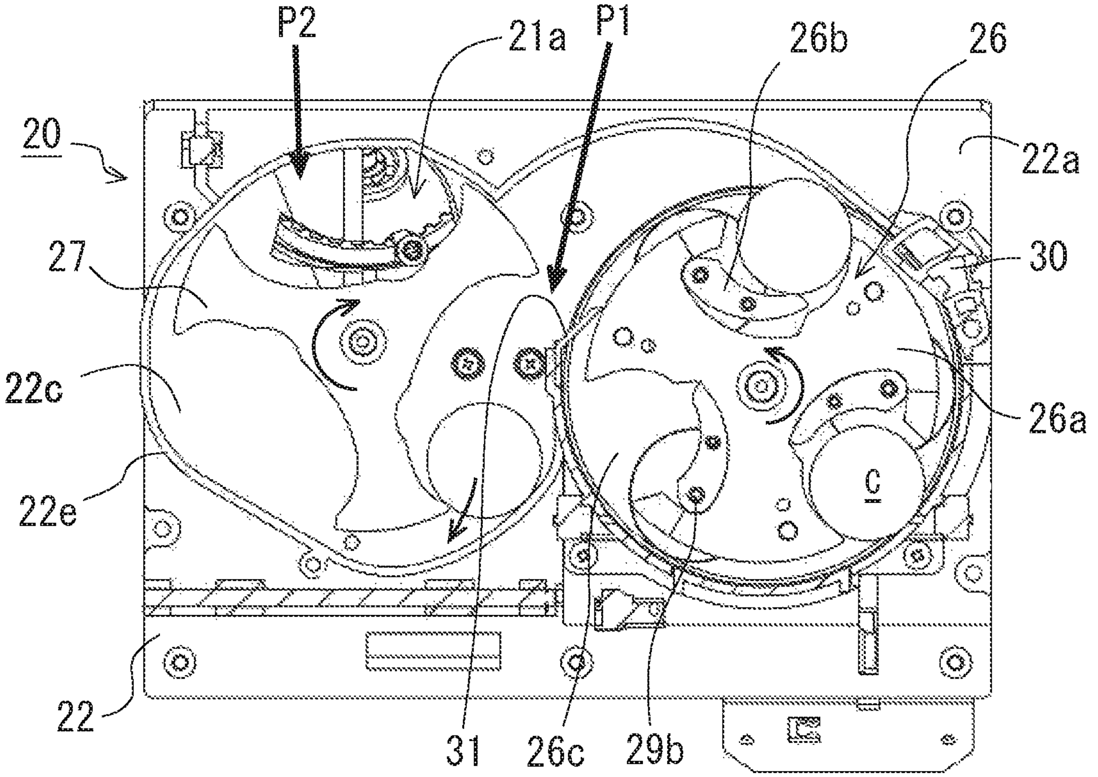
FIG. 14E is an explanatory view showing the coin feeding operation of the coin separation and discrimination unit of the apparatus for discrimination and conveyance of coins of FIG. 1, in which the head and the substrate box are detached, which is subsequent to FIG. 14D.
Figure 14F:
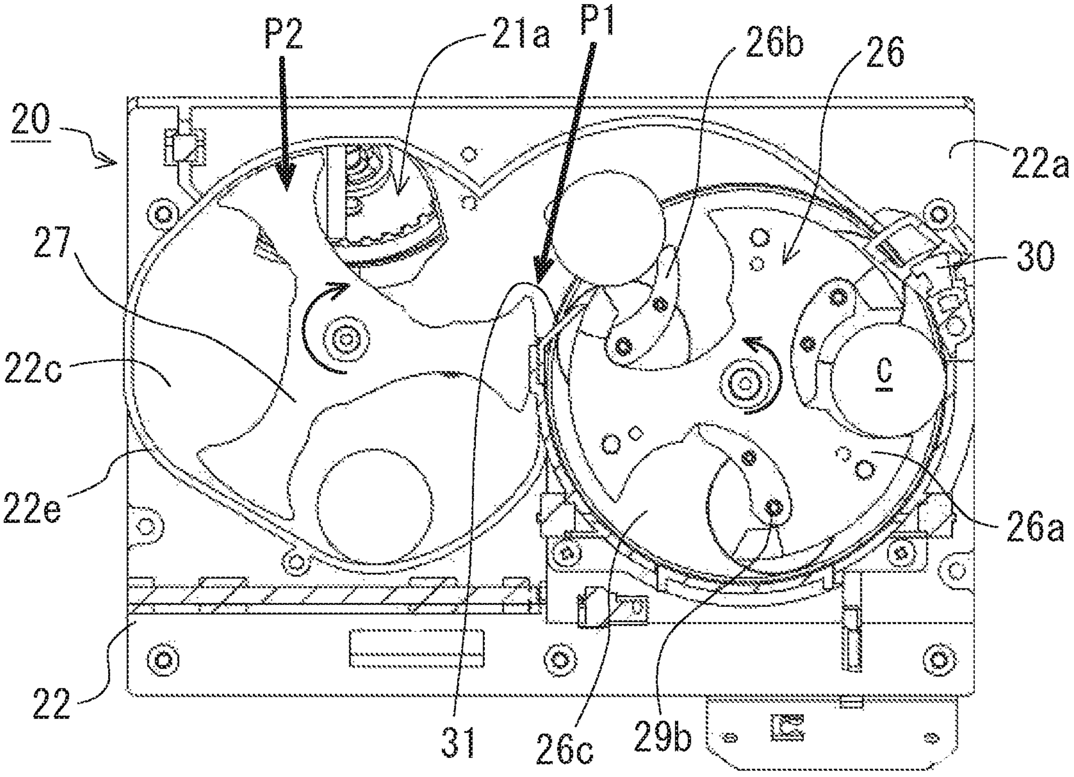
FIG. 14F is an explanatory view showing the coin feeding operation of the coin separation and discrimination unit of the apparatus for discrimination and conveyance of coins of FIG. 1, in which the head and the substrate box are detached, which is subsequent to FIG. 14E.

The first coin C which is received by the closest-positioned arm of the wiper 27 is moved downward along with the relevant arm by the clockwise rotation of the wiper 27. This state is shown in FIG. 14E. When the relevant arm is displaced upward due to the further rotation of the wiper 27, the said coin C is unable to follow the motion of the said arm due to the gravity and thus, the said coin C is apart from the said arm. As a result, as shown in FIG. 14F, the said coin C is temporarily stopped at the lowest position of the guide wall 22*e*.

Figure 14G:
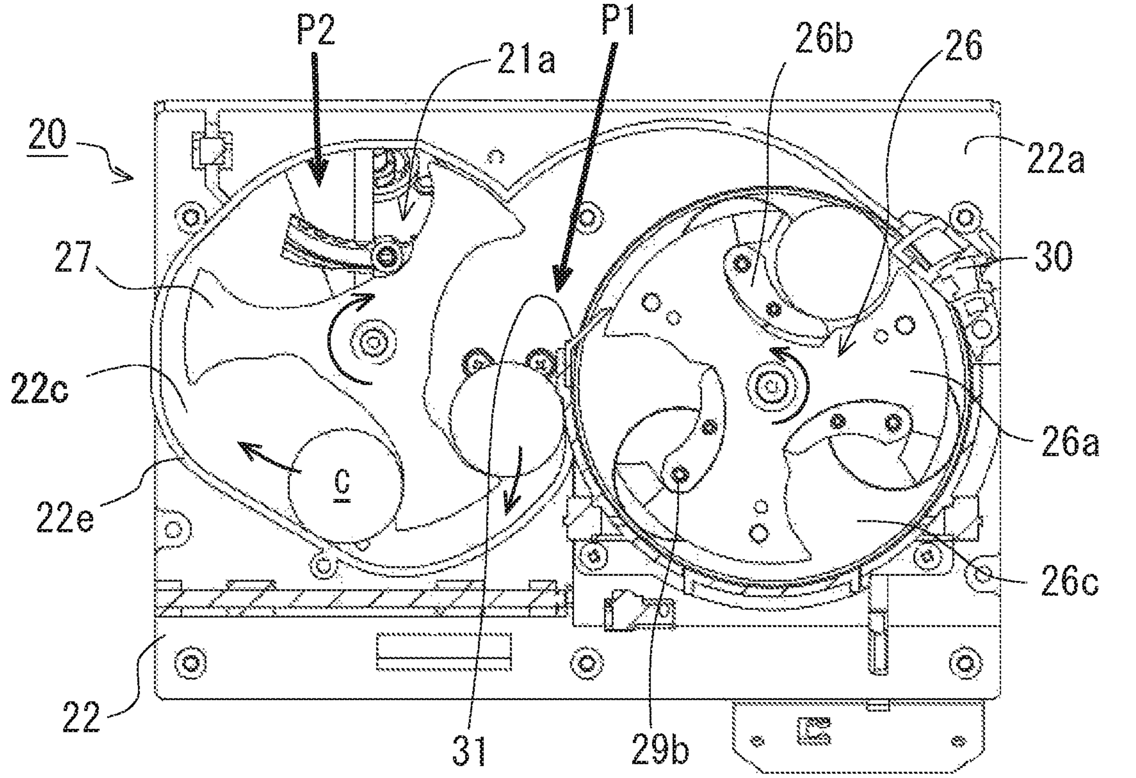
FIG. 14G is an explanatory view showing the coin feeding operation of the coin separation and discrimination unit of the apparatus for discrimination and conveyance of coins of FIG. 1, in which the head and the substrate box are detached, which is subsequent to FIG. 14F.
Figure 14H:
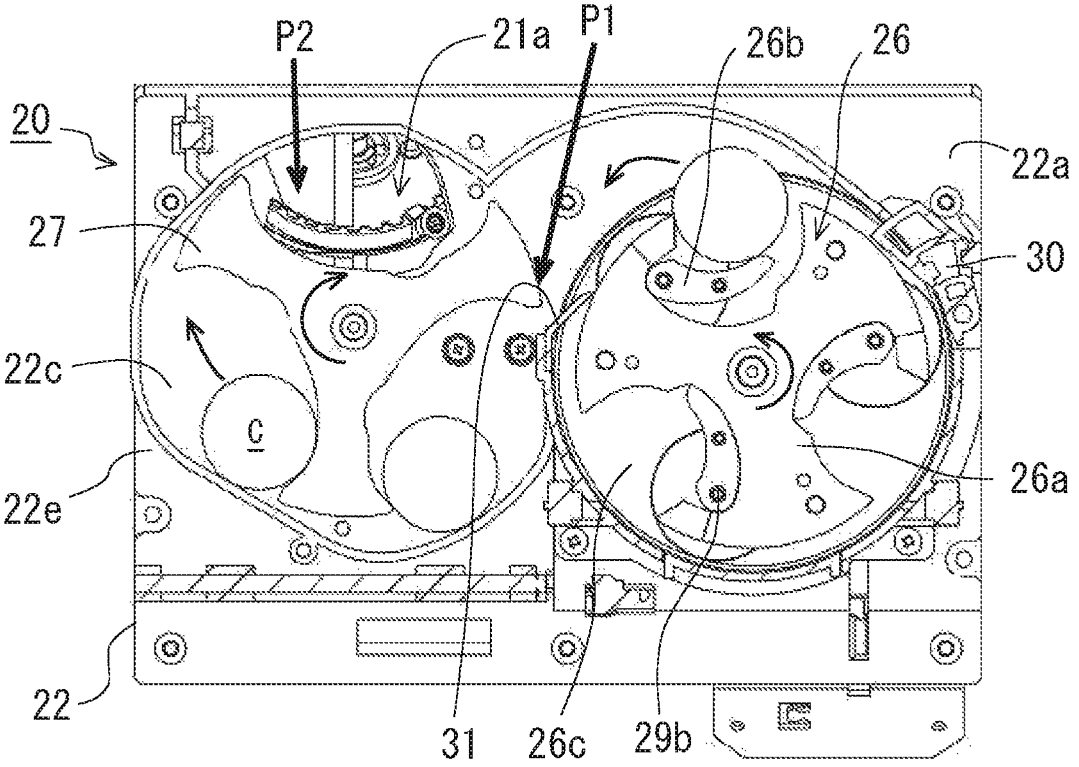
FIG. 14H is an explanatory view showing the coin feeding operation of the coin separation and discrimination unit of the apparatus for discrimination and conveyance of coins of FIG. 1, in which the head and the substrate box are detached, which is subsequent to FIG. 14G.

Because of the further rotation of the wiper 27, (the downstream-side edge of) the next arm is contacted with the first coin C which is temporarily stopped at the lowest position of the guide wall 22*e*, thereby raising the said first coin C by the said arm. At this stage, as shown in FIG. 14G, the second coin C is contacted with (the upstream-side edge of) the said arm and supported by the same. The first coin C which is temporarily stopped is raised by the relevant arm due to the further rotation of the wiper 27, as shown in FIG. 14H. Since the first coin C passes through the discrimination region P3 at this stage, the denomination discrimination and the authenticity discrimination for the first coin C are carried out automatically. Here, not only the denomination discrimination but also the authenticity discrimination are carried out. At this stage, similar to the first coin C, the third coin C is pushed out from the relevant engaging recess 26*c* by the pushing action of the relevant pushing member 26*b*.

Figure 14I:
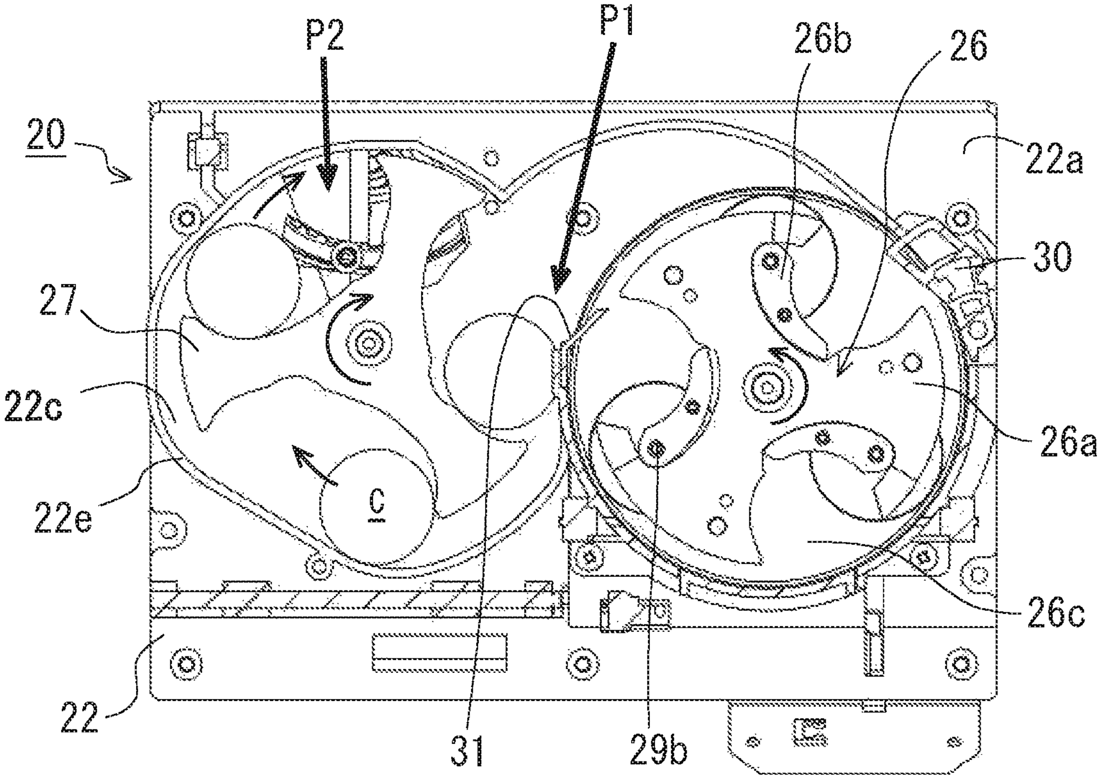
FIG. 14I is an explanatory view showing the coin feeding operation of the coin separation and discrimination unit of the apparatus for discrimination and conveyance of coins of FIG. 1, in which the head and the substrate box are detached, which is subsequent to FIG. 14H.

Because of the further rotation of the wiper 27, the first coin C which has been subjected to the denomination and authenticity discrimination is further raised by the relevant arm, as shown in FIG. 14I. At this stage, the second coin C is raised by the relevant arm to pass through the discrimination region P3 and furthermore, the third coin C passes through the first delivering region P1 to be delivered to the coin discrimination section from the coin separation section.

Figure 14J:
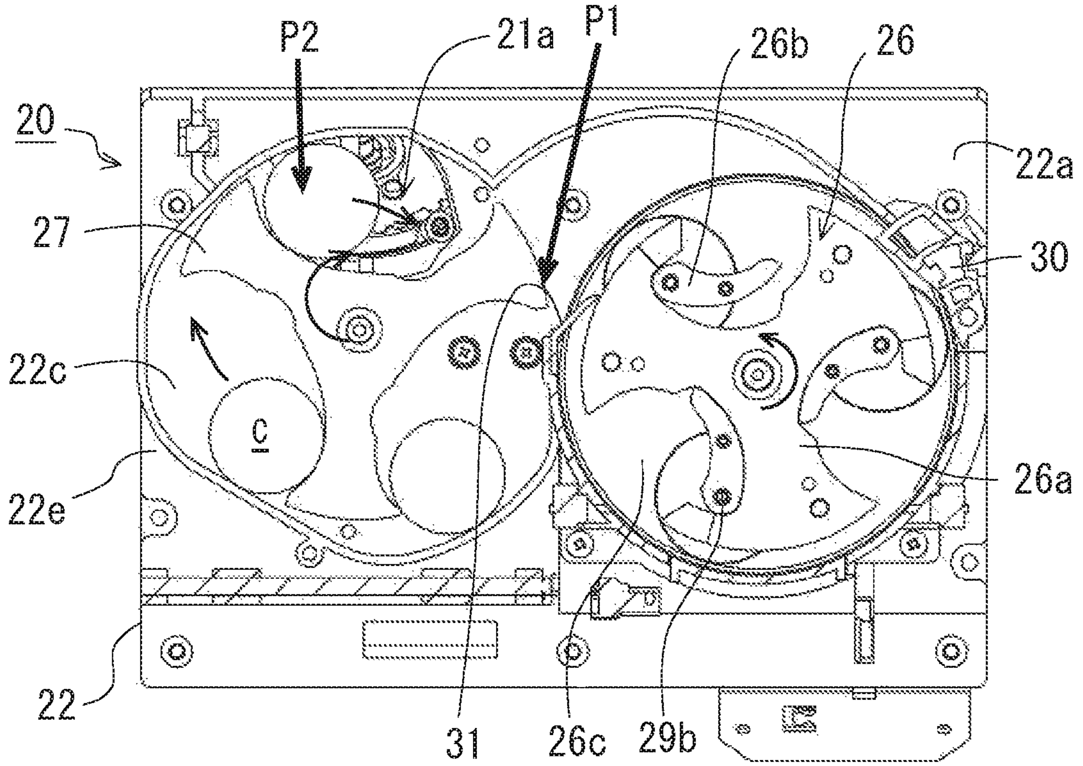
FIG. 14J is an explanatory view showing the coin feeding operation of the coin separation and discrimination unit of the apparatus for discrimination and conveyance of coins of FIG. 1, in which the head and the substrate box are detached, which is subsequent to FIG. 14I.

Because of the further rotation of the wiper 27, the first coin C which has been subjected to the denomination and authenticity discrimination arrives at the second delivering region P2, as shown in FIG. 14J. At this stage, since the second coin C is raised by the relevant arm to pass through the discrimination region P3, the second coin C is subjected to the denomination and authenticity discrimination. The state of the third coin C is approximately the same as that of the first coin C shown in FIG. 14E.

Figure 14K:
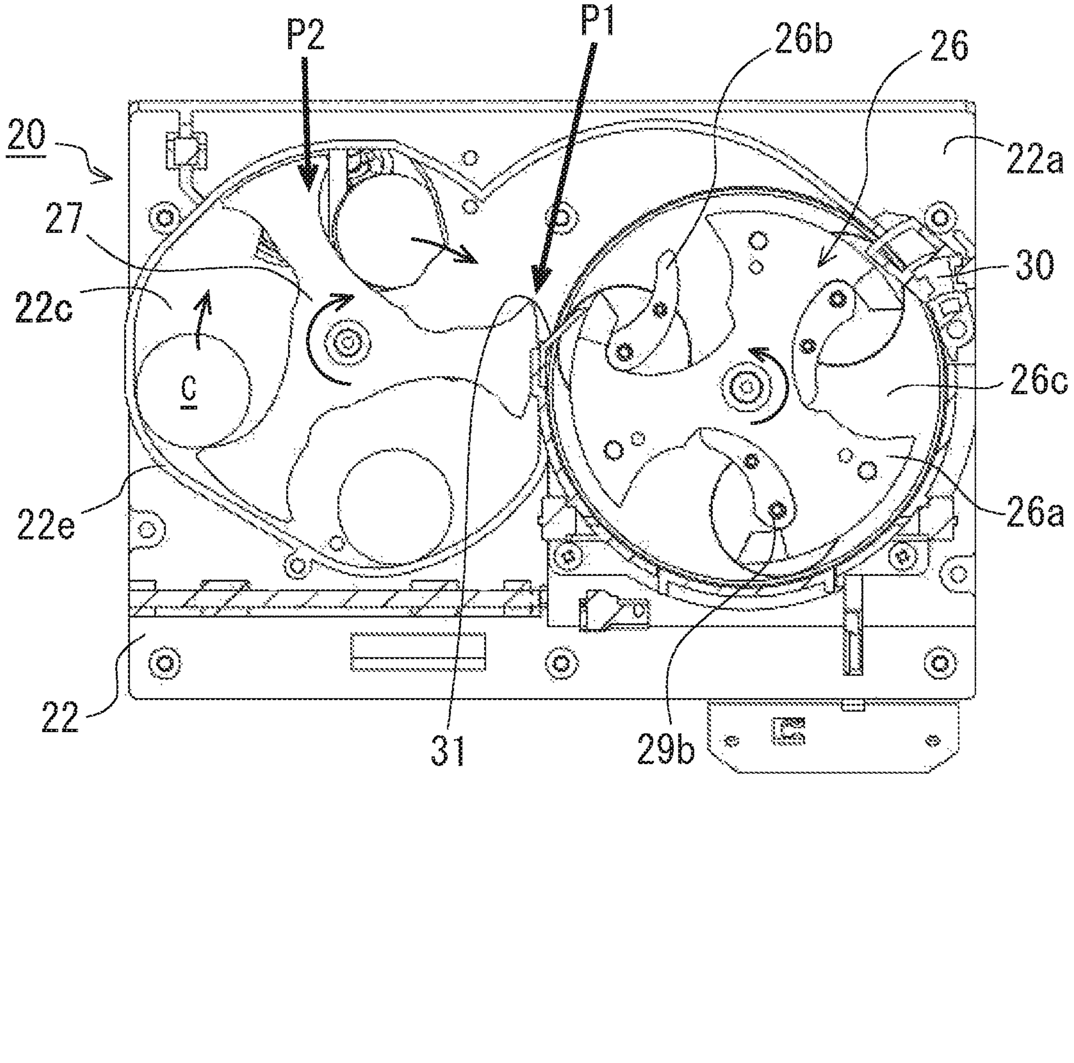
FIG. 14K is an explanatory view showing the coin feeding operation of the coin separation and discrimination unit of the apparatus for discrimination and conveyance of coins of FIG. 1, in which the head and the substrate box are detached, which is subsequent to FIG. 14J.

Because of the further rotation of the wiper 27, the first coin C, which has arrived at the second delivering region P2, passes through this region P2, in other words, passes through the through hole 22*d* of the upper wall 22*a* and the opening 21*a* of the base plate 21. As a result, the leading end of the first coin C arrives at the back side of the base plate 21 (in other words, the back side of the coin discrimination section), as shown in FIG. 14K. At this stage, the second coin C, which has been subjected to the denomination and authenticity discrimination in the discrimination region P3, is raised by the relevant arm. The third coin C is temporarily stopped at the lowest position of the guide wall 22*e*.

Figure 14L:
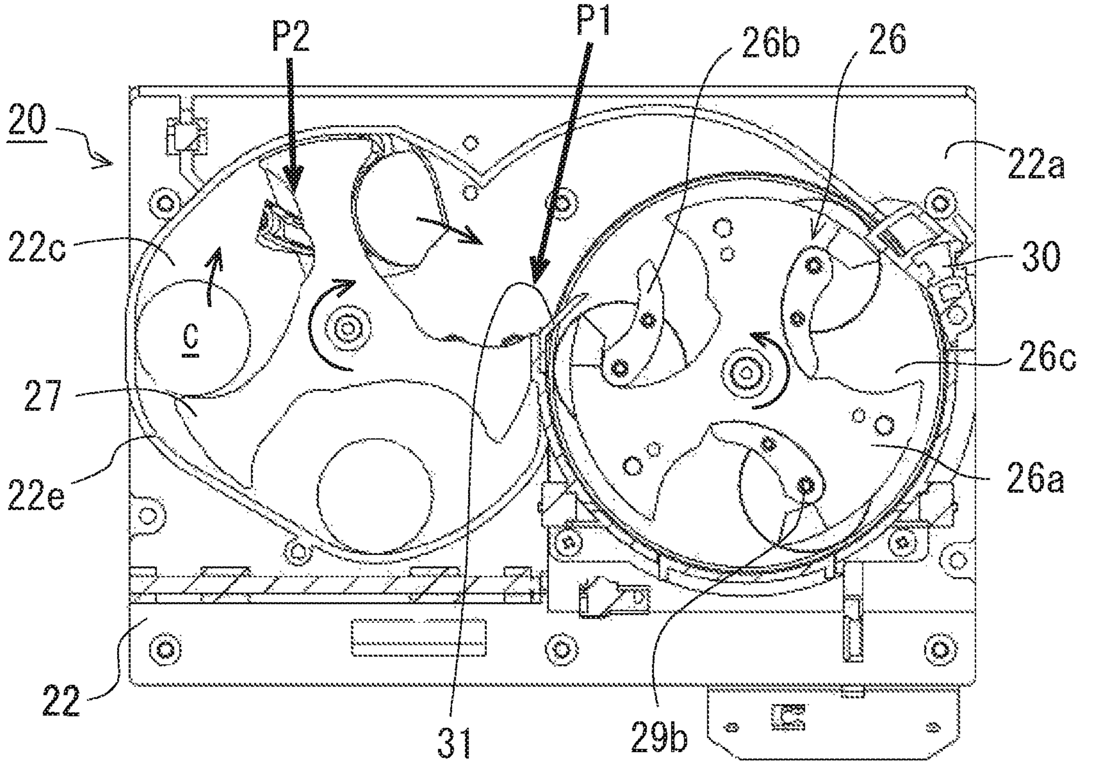
FIG. 14L is an explanatory view showing the coin feeding operation of the coin separation and discrimination unit of the apparatus for discrimination and conveyance of coins of FIG. 1, in which the head and the substrate box are detached, which is subsequent to FIG. 14K.

Because of the further rotation of the wiper 27, the first coin C which has passed through the second delivering region P2, the leading end of which has arrived at the back side of the base plate 21, starts to move downward due to the gravity, as shown in FIG. 14L. At this stage, the first coin C is contacted with the direction changing member 74 mounted near the starting end of the coin conveyance path 76 of the coin conveyance and distribution unit 60 and as a result, the first coin C changes its moving direction toward the said starting end (i.e., the entrance) of the path 76. The second coin C which has been subjected to the denomination and authenticity discrimination is raised by the relevant arm. The third coin C is still temporarily stopped at the lowest position of the guide wall 22*e*.

Figure 14M:
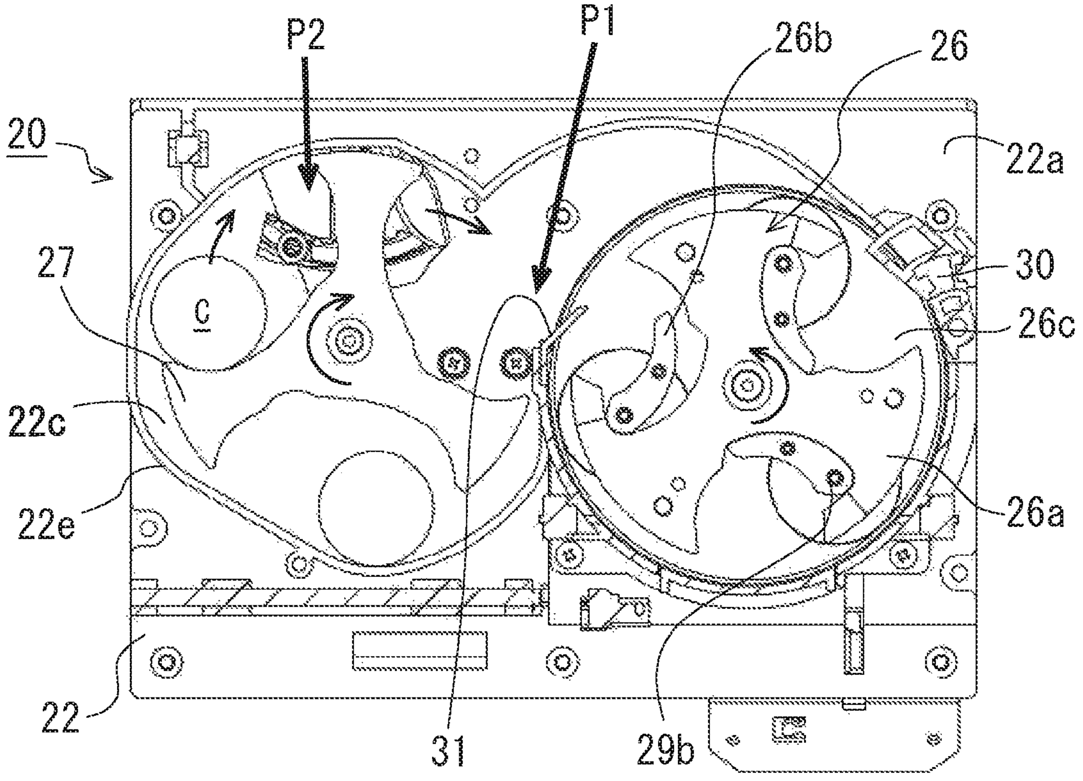
FIG. 14M is an explanatory view showing the coin feeding operation of the coin separation and discrimination unit of the apparatus for discrimination and conveyance of coins of FIG. 1, in which the head and the substrate box are detached, which is subsequent to FIG. 14L.

Because of the further rotation of the wiper 27, the first coin C whose leading end has arrived at the back side of the base plate 21 is kept moving toward the starting end or entrance of the coin conveyance path 76 while the moving direction of the first coin C is being changed due to the gravity and the direction changing member 74, as shown in FIG. 14M. At this stage, the second coin C, which has been subjected to the denomination and authenticity discrimination, is made closer to the second delivering region P2. The third coin C is still temporarily stopped at the lowest position of the guide wall 22*e*.

Figure 14N:
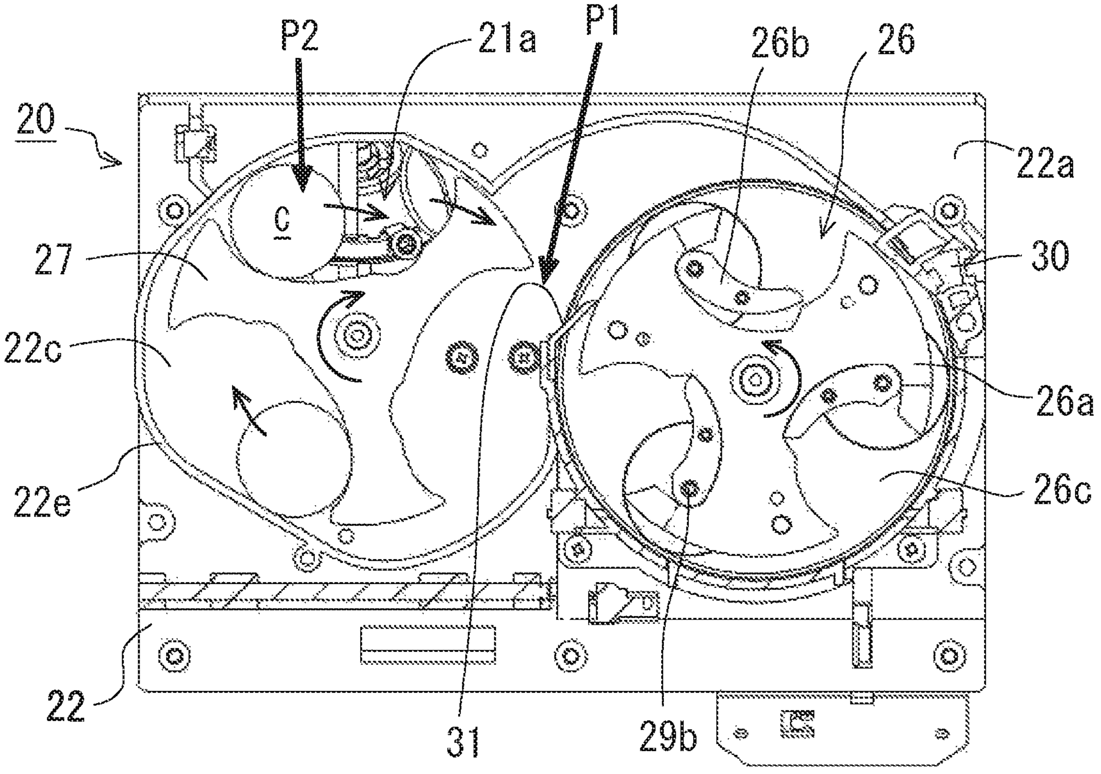
FIG. 14N is an explanatory view showing the coin feeding operation of the coin separation and discrimination unit of the apparatus for discrimination and conveyance of coins of FIG. 1, in which the head and the substrate box are detached, which is subsequent to FIG. 14M.
Figure 140:
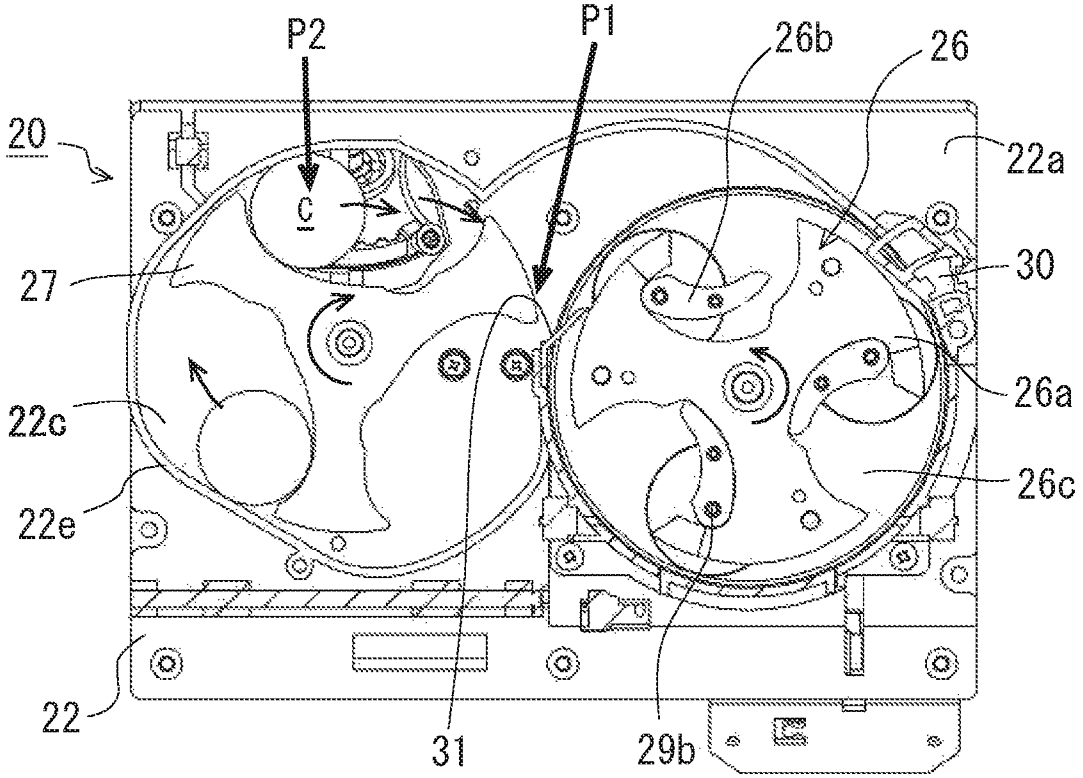

Because of the further rotation of the wiper 27, the first coin C whose leading end has arrived at the back side of the base plate 21 is kept moving toward the starting end or entrance of the coin conveyance path 76, as shown in FIG. 14N. At this stage, the second coin C, which has been subjected to the denomination and authenticity discrimination, arrived at the second delivering region P2. The third coin C is raised from the lowest position of the guide wall 22*e* by the relevant arm.

Because of the further rotation of the wiper 27, the entirety of the first coin C arrives at the back side of the base plate 21 and the leading end of the said coin C is entered the entrance of the coin conveyance path 76, as shown in FIG. 14O. At this stage, the second coin C, which has already been subjected to the denomination and authenticity discrimination, starts to pass through the second delivering region P2. The third coin C is subjected to the denomination and authenticity discrimination in the discrimination region P3 while being raised from the lowest position of the guide wall 22*e* by the relevant arm.

Through the aforementioned processes, the first coin C, which has been separated from the remaining coins C in the coin separation section, is delivered to the coin discrimination section from the coin separation section by way of the first delivering region P1. After the first coin C is subjected to the predetermined denomination and authenticity discrimination in the discrimination region P3 in the coin discrimination section, the first coin C is delivered to the coin conveyance and distribution unit 60 by way of the second delivering region P2.

In the coin conveyance and distribution unit 60, the coins C which have been delivered from the coin separation and discrimination unit 20 by way of the second delivering region P2 are conveyed on the linear coin conveyance path 76 using the pins 63*a* fixed onto the endless belt 63. During the conveyance, the four gates 76*a*, which are formed on the coin conveyance path 76 and respectively assigned to the first, second, third, and fourth distribution sections D1, D2, D3, and D4, are opened or closed based on the result of the denomination discrimination which is carried out in the coin discrimination section of the unit 20, thereby distributing the coins C of the predetermined eight denominations into the corresponding coin ejection devices. The opening/closing operation of each gate 76*a* is realized by opening or closing the corresponding distribution flap 70 using the corresponding distribution flap driving solenoid 72.

Moreover, during the conveyance of coins C along the coin conveyance path 76, the rejection gate is opened or closed based on the result of the authenticity discrimination which is carried out in the coin discrimination section of the unit 20, thereby discharging selectively the rejecting coins C (e.g., counterfeit coins) to be judged rejected into the dedicated storing container. The opening/closing operation of the rejection gate is realized by opening or closing the rejection flap 71 using the rejection flap driving solenoid 73.

The aforementioned operation in the coin separation and discrimination unit 20 and that in the coin conveyance and distribution unit 60 are controlled by the control device (the control program) of the apparatus 1 according to the embodiment of the present invention which is mounted on the control substrate 32 in the substrate box 23 of the unit 20.

With the apparatus 1 for discrimination and conveyance of coins according to the embodiment of the present invention, as explained above in detail, the coin separation and discrimination unit 20 comprises the coin separation section that is configured to separate coins C stored in the storing unit 10 from each other, thereby sending the separated coins C in the predetermined attitude; and the coin discrimination section, which is mounted on the upper wall 22*a* of the casing 22 (which corresponds to the supporting member) having the through hole 22*d*, that is configured to discriminate the denomination and authenticity of the coins C sent from the coin separation section, thereby sending the discriminated coins C. The coin conveyance and distribution unit 60 is configured to distribute the coins C which are subjected to the denomination and authenticity discrimination in the coin discrimination section according to the respective denominations while conveying the said coins C.

Moreover, when seeing the moving state or flow of the coins C macroscopically, the coins C separated in the coin separation section of the unit 20 are moved in the X direction shown in FIG. 8 (which corresponds to the first direction) in the horizontal plane through the first delivering region P1 and then, delivered to the coin discrimination section of the unit 20; in which the first delivering region P1 is formed at the connecting part of the coin separation section to the coin discrimination section. The coins C whose denomination and authenticity are discriminated in the coin discrimination section are moved in the Y direction shown in FIG. 8 (which corresponds to the second direction) which is perpendicular to the X direction in the horizontal plane through the second delivering region P2 and then, delivered to the coin conveyance and distribution unit 60; in which the second delivering region P2 is formed at the connecting part of the coin discrimination section and the coin conveyance and distribution unit 60. In the second delivering region P2, the conveying direction of the coins C is changed from the X direction to the Y direction by way of the through hole 22*d* of the upper wall 22 and the opening 21*a* of the base plate 21. In the Y direction in the coin conveyance and distribution unit 60, the coins C are subjected to the distribution while being conveyed.

Accordingly, the coins C separated from each other by the coin separation section are moved in the X direction through the first delivering region P1 to be delivered to the coin discrimination section and then, the denomination and authenticity of the coins C are discriminated by the coin discrimination section. Thereafter, the coins C thus discriminated are moved in the Y direction which is perpendicular to the X direction to be delivered to the coin conveyance and distribution unit 60.

In the coin separation section, the plate-shaped rotary disk 26 is used and therefore, when seeing in a plan view, the ratio (Lcs/Dcs) of the length Lcs of the coin separation section of the coin separation and discrimination unit 20 in the X direction to the depth Dcs of the coin separation section of the unit 20 in the Y direction is considerably large even if the inclination angle of the upper wall 22*a* and the driving mechanism (which includes the motor 41, the driving gear 42, and the driven gears 43, 44, and 45) for the disk 26 are taken into consideration. This is because the length Lcs is considerably larger than the depth Dcs.

In the coin discrimination section, the plate-shaped rotary wiper 27 is used and therefore, when seeing in a plan view, the ratio (Lcd/Dcd) of the length Lcd of the coin discrimination section of the unit 20 in the X direction to the depth Dcd of the coin discrimination section of the unit 20 in the Y direction is considerably large even if the inclination angle of the upper wall 22*a* and the driving mechanism (which includes the motor 41, the driving gear 42, and the driven gears 43, 44, and 45) for the wiper 27 are taken into consideration. This is because the length Lcd is considerably larger than the depth Dcd.

For this reason, regarding the combination of the coin separation section and the coin discrimination section (i.e., the coin separation and discrimination unit 20) which is formed by aligning the coin separation section and the coin discrimination section to be adjacent to each other in the X direction, the ratio (L20/D20) of the length L20 of the coin separation and discrimination unit 20 in the X direction with respect to the depth D20 of the same unit 20 in the Y direction is larger in value than each of the ratios (Lcs/Dcs) and (Lcd/Dcd). This means that the coin separation and discrimination unit 20 as the combination has the feature that the length L20 is relatively large and the depth D20 is relatively small and that the ratio (L20/D20) is very large, in other words, the coin separation and discrimination unit 20 has an elongated plan shape along the X direction.

On the other hand, in the coin conveyance and distribution unit 60, since the four coin ejection devices are arranged along the coin conveyance path 76 of the unit 60, the length L60 varies in accordance with the total number of the denominations to be processed. However, generally speaking, the coin conveyance and distribution unit 60 has the feature that the length L60 in the Y direction is relatively large and the depth D60 in the X direction is relatively small and that the ratio (L60/D60) is very large, in other words, the coin conveyance and distribution unit 60 has an elongated plan shape along the Y direction.

Accordingly, when constituting the apparatus 1 for discrimination and conveyance of coins according to the embodiment of the present invention by combining the coin separation and discrimination unit 20 with the coin conveyance and distribution unit 60, it is preferred that the coin separation and discrimination unit 20 and the coin conveyance and distribution unit 60 are disposed so as to be perpendicular to each other in a plan view to reduce the size of the said apparatus 1. For example, it is preferred that the coin separation and discrimination unit 20 is disposed to be extended in the X direction and the coin conveyance and distribution unit 60 is disposed to be extended in the Y direction in a plan view, as shown in FIGS. 1 and 8. This layout may be termed the "L-shaped layout". This is because the length L1 of the apparatus 1 using the L-shaped layout in the Y direction is considerably smaller than that of the conventional linear layout where both of the two units 20 and 60 are aligned in the Y direction (which may be termed the "I-shaped layout"). This is reflection of the aforementioned feature that the coin separation and discrimination unit 20 has an elongated plan shape extended along the X direction and the feature that the coin conveyance and distribution unit 60 has an elongated plan shape extended along the Y direction.

In addition, although the length L1 of the apparatus 1 using the L-shaped layout in the Y direction is considerably smaller than that of the conventional linear layout, the depth D1 of the apparatus 1 in the X direction is slightly larger than that of the conventional linear layout. However, this disadvantage can be easily solved and therefore, there arises no problem.

As a result, the apparatus 1 for discrimination and conveyance of coins according to the embodiment of the present invention can be downsized compared with the aforementioned conventional apparatus of this type.

Moreover, since all the need for realizing the aforementioned L-shaped layout is to change the conveyance direction of coins C conveyed in the coin separation and discrimination unit 20 to the Y direction from the X direction by way of the second delivering region R2 formed at the connecting part of the coin separation and discrimination unit 20 and the coin conveyance and distribution unit 60, the aforementioned downsizing of the apparatus 1 can be realized with a simple and low-cost structure.

Furthermore, to realize the aforementioned downsizing of the apparatus 1, it is sufficient to provide the second delivering region P2 and the moving direction changing mechanism for the coins C (e.g., the direction changing member 74) at the connecting part of the coin separation and discrimination unit 20 and the coin conveyance and distribution unit 60 and therefore, it is unnecessary to change the fundamental or basic structure of the coin discrimination section. Accordingly, downsizing of the said apparatus 1 itself can be achieved compared with the aforementioned conventional apparatuses of this type without changing the fundamental or basic structure of the coin discrimination section.

With the apparatus 1 using the aforementioned L-shaped layout, as described above, the length L1 of the apparatus 1 in the Y direction can be reduced compared with the conventional linear layout; however, there arises a disadvantage that the depth D1 of the apparatus 1 in the X direction is slightly larger than that of the conventional one. However, this disadvantage can be easily addressed or solved on the side of the main apparatus (e.g., a coin depositing/dispensing apparatus) into which the apparatus 1 is incorporated. Accordingly, there arises no problem to achieve the objects of the present invention.

Modifications

The aforementioned embodiment is an exemplary embodied example of the present invention. Thus, it is needless to say that the present invention is not limited to this embodiment and any other modification is applicable to the embodiment without departing the spirit of the invention.

For example, in the aforementioned embodiment, the coin conveyance path 76 formed using the guide rail 66 and the inclined portions 77*a* and 78*a* of the rear and front covers 77 and 78, the endless belt 63 having the pins 63*a*, and the four gates 76*a* respectively arranged in the first to fourth distribution sections D1, D2, D3, and D4 are provided in the coin conveyance and distribution unit 60; however, the present invention is not limited to this. Any other structure may be used for this purpose if it is capable of desired coin distribution while conveying coins.

INDUSTRIAL APPLICABILITY

The apparatus for discrimination and conveyance of coins according to the present invention is applicable not only to coins as currency but also to coin equivalents such as token and medals. Moreover, the apparatus for discrimination and conveyance of coins according to the present invention is applicable not only to any coin depositing/dispensing apparatus but also to any coin processing apparatus that necessitates selective conveyance and distribution of coins of desired denominations.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. An apparatus for discrimination and conveyance of coins, comprising:

a coin separator that is configured to separate coins which are stored in a coin storage from each other, thereby sending the separated coins in a predetermined attitude, the coin separator including a first rotor that pushes coins;

a coin discriminator that is mounted on a support and configured to discriminate a denomination of coins which are sent from the coin separator, the support having an opening that is configured to allow passage of the discriminated coins from the coin discriminator to a coin conveyor/distributor, the coin discriminator including a second rotor that pushes coins; and the coin conveyor/distributor that is configured to distribute coins which are subjected to denomination discrimination in the coin discriminator according to respective denominations while conveying the coins;

wherein coins separated in the coin separator are moved in a first direction in a plan view through a first delivering region and delivered to the coin discriminator; wherein the first delivering region is formed at a connecting part of the coin separator to the coin discriminator;

coins whose denomination is discriminated in the coin discriminator are moved in a second direction which is approximately perpendicular to the first direction in a plan view through a second delivering region and delivered to the coin conveyor/distributor by passing through the opening; wherein the second delivering region is formed at a connecting part of the coin discriminator and the coin conveyor/distributor;

a moving direction of coins is changed from the first direction to the second direction as the coins pass through the opening and fall from the opening in the second delivering region such that the coins are delivered to the coin conveyor/distributor; and the coins are subjected to distribution while being conveyed in the second direction in the coin conveyor/distributor;

wherein a coin conveyance path is formed in the coin conveyor/distributor, wherein the coin conveyance path is configured to allow the coins that are delivered from the coin discriminator to be distributed while being conveyed;

a diverter is formed between the opening and an entrance of the coin conveyance path; wherein the diverter is configured to change a moving direction of coins which are delivered from the coin discriminator toward the coin conveyor/distributor through the opening; and the diverter is disposed near an entrance of the coin conveyance path;

and the moving direction of the delivered coins from the coin discriminator through the opening is changed by contact with the diverter and the coins whose moving direction has been changed are entered into the entrance of the coin conveyance path;

an endless belt to which pins are fixed at intervals is extended along the coin conveyance path; and wherein each coin is engaged with any one of the pins and conveyed on the coin conveyance path according to traveling of the belt, and wherein the diverter is positioned outside of the endless belt and is located alongside a straight side of the endless belt, and wherein the first rotor and the second rotor are arranged side-by-side such that a direction passing through both a center of the first rotor and a center of the second rotor is generally perpendicular to the straight side of the endless belt.

2. The apparatus according to claim 1, wherein the coin discriminator conducts its discrimination operation for coins which are delivered from the coin separator by way of the first delivering region using the second rotor, which is a plate-shaped rotor that is rotationally driven on the support.

3. The apparatus according to claim 1, wherein the coin discriminator conducts its discrimination operation for coins which are delivered from the coin separator by way of the first delivering region using the second rotor, which is a plate-shaped rotor that is rotationally driven on the support and a guide wall which is formed on the support; and the guide wall conducts its guiding operation (i) when coins are delivered from the coin separator to the coin discriminator by way of the first delivering region, (ii) when coins which are delivered to the coin discriminator are moved in the coin discriminator, and (iii) when coins which are moved in the coin discriminator are delivered to the conveyor/distributor by way of the second delivering region.

4. The apparatus according to claim 1, wherein the the second rotor is a rotary plate that is rotationally driven on the support, which is inclined with respect to a horizontal plane, and discrimination sensors fixed on the support in a discrimination region that is overlapped with the rotary plate; and wherein discrimination of the coins that are delivered from the coin separator to the coin discriminator by way of the first delivering region is performed using the discrimination sensors when the coins pass through the discrimination region in response to rotation of the rotary plate.

5. The apparatus according to claim 1, wherein the coin separator conducts its separation operation for coins which are stored in the coin storage from each other using the first rotor, which is a rotary plate that is rotationally driven on the support.

6. The apparatus according to claim 1, wherein the coin separator is mounted on the support along with the coin discriminator; and the first delivering region is formed on the support.

7. The apparatus according to claim 1, wherein the diverter and the coin conveyor/distributor are placed on a back side of the support; and the delivered coins from the coin discriminator through the opening are contacted with the diverter and enter the entrance of the coin conveyance path on the back side of the support using natural falling of the coins due to gravity.

8. The apparatus according to claim 1, wherein the coin conveyance path is formed using a guide rail and an inclined surface;

the guide rail forms a bottom of the coin conveyance path;

the inclined surface forms one sidewall of the coin conveyance path; and coins are conveyed on the coin conveyance path in an obliquely standing state while a periphery and one side of each coin are respectively supported by the guide rail and the inclined surface.

9. The apparatus according to claim 1, wherein the endless belt is driven by a common driving force in synchronization with an operation motion of the coin separator and an operation of the discriminator.

10. The apparatus according to claim 1, wherein the diverter is a guide plate.

* * * * *